US011992963B2

(12) United States Patent
Glenn, II

(10) Patent No.: US 11,992,963 B2
(45) **Date of Patent: *May 28, 2024**

(54) PRESS AND METHODS FOR CUTTING AND FOLDING A SAFETY RAZOR TO FORM A 2-BLADE SYSTEM FOR A RAZOR HEAD, AND ASSEMBLY

(71) Applicant: Robert J. Glenn, II, Chicago, IL (US)

(72) Inventor: Robert J. Glenn, II, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/123,136

(22) Filed: Mar. 17, 2023

(65) Prior Publication Data

US 2023/0226707 A1 Jul. 20, 2023

Related U.S. Application Data

(63) Continuation of application No. 17/877,344, filed on Jul. 29, 2022, now Pat. No. 11,628,584, which is a continuation of application No. PCT/US2022/012681, filed on Jan. 17, 2022.

(60) Provisional application No. 63/232,565, filed on Aug. 12, 2021, provisional application No. 63/138,434, filed on Jan. 16, 2021.

(51) Int. Cl.

*B26B 21/52* (2006.01)
*B21D 53/64* (2006.01)
*B26B 21/40* (2006.01)

(52) U.S. Cl.

CPC .......... *B26B 21/521* (2013.01); *B21D 53/645* (2013.01); *B26B 21/4068* (2013.01); *B26B 21/4012* (2013.01)

(58) Field of Classification Search

None

See application file for complete search history.

(56) References Cited

U.S. PATENT DOCUMENTS 2,364,236 A 12/1944 Muros
2,418,958 A 4/1947 Stock
4,146,958 A 4/1979 Chen (Continued)

OTHER PUBLICATIONS

International Search Report and Written Opinion of International Searching Authority for International Application No. PCT/US2022/012681, dated Jun. 8, 2022 (10 pages).

*Primary Examiner* — Hwei-Siu C Payer

(74) *Attorney, Agent, or Firm* — Ice Miller LLP; Justin D. Swindells

(57) ABSTRACT

A shaving head that doubles as breaking mechanism to break a safety razor blade into two pieces to form a 2-blade shaving razor. The shaving head includes a front component having a retention guide, a first position stop and a second position stop at a distance offset from the first position stop. The shaving head further includes a back component having a blade slot configured to receive a first blade portion and a second blade portion formed from breaking a double-edge safety razor blade such that the first blade portion has a different width compared to the second blade portion. The retention guide is configured to retain the first blade portion and the second blade portion in the blade slot responsive to the retention guide being at least partially inserted into the blade slot. The sharp shaving edges once installed form a shaving angle between 5 and 30 degrees, where the shaving angle is determined by where the blade is broken.

8 Claims, 22 Drawing Sheets

(56) References Cited

U.S. PATENT DOCUMENTS

| | | | | |
|---|---|---|---|---|
| 5,222,300 | A | 6/1993 | Althaus | |
| 5,590,468 | A | 1/1997 | Prochaska | |
| 6,415,639 | B1 | 7/2002 | Killian | |
| 10,538,005 | B2 | 1/2020 | Barrett | |
| 11,020,864 | B2 | 6/2021 | Spencer | |
| 11,235,483 | B2 | 2/2022 | Hahn | |
| 11,628,584 | B2 * | 4/2023 | Glenn, II | B21D 53/645 30/527 |
| 2014/0263523 | A1 | 9/2014 | Allyn | |
| 2017/0297212 | A1 | 10/2017 | Nordstrom | |
| 2020/0094427 | A1 | 3/2020 | Barrett | |
| 2021/0221013 | A1 | 7/2021 | Duvall | |
| 2022/0362956 | A1 | 11/2022 | Glenn, II | |
| 2023/0226707 | A1 * | 7/2023 | Glenn, II | B26B 21/18 30/527 |

* cited by examiner

PRESS AND METHODS FOR CUTTING AND FOLDING A SAFETY RAZOR TO FORM A 2-BLADE SYSTEM FOR A RAZOR HEAD, AND ASSEMBLY

CROSS-REFERENCE TO RELATED APPLICATION

This application is a continuation of U.S. patent application Ser. No. 17/877,344, filed Jul. 29, 2022, now U.S. Pat. No. 11,628,584, which is a continuation of International Application No. PCT/US2022/012681, filed Jan. 17, 2022, which claims priority to and the benefit of U.S. Provisional Patent Application Ser. No. 63/138,434, filed Jan. 16, 2021, entitled, "Press and Methods for Cutting and Folding a Safety Razor to Form a 2-Blade System for a Razor Head, and Assembly," and U.S. Provisional Patent Application Ser. No. 63/232,565, filed Aug. 12, 2021, entitled "Press and Methods for Cutting and Folding a Safety Razor to Form a 2-Blade System for a Razor Head, and Assembly," all of which are incorporated herein in their respective entireties.

BACKGROUND OF THE INVENTION

Shaving razors, typically called safety razors, have been used for shaving for over a century. They typically utilize a replaceable double-edge safety razor blade in a configuration that allows a user to shave with one side of the blade at a time for a single blade shave. These products have the advantage of using a replaceable blade that is inexpensive when compared to other alternatives while providing a less irritating and straight razor like shave. These products have the disadvantage of requiring more skill and practice to achieve a safe and close shave over multiple blade cartridge style razor designs. Multiple blade razors with replaceable cartridge style blades are also widely used with cutting blade counts ranging from two to five blades. These razors have the advantage of requiring less skill and practice to use because of the geometry of a multi blade design. Multiple blade razors have the disadvantage of being expensive due to their complexity of design. Conventional disposable razors and shaving razors with replaceable cartridges are discarded and their plastic and metal parts end up in landfills, contributing to a global waste management problem.

SUMMARY OF THE INVENTION

Disclosed herein is a shaving head assembly made of a shaving head front and a shaving head back component, a replaceable handle, and a blade loading device that delivers the quality and economic advantages of a double-edge safety razor shave with the usage advantages of a multi-blade cartridge shave requiring less skill and practice. The two-piece shaving head design used in conjunction with the blade loading device and a standard double-edge safety razor blade also referred to as blade will safely break the blade into two parts while folding those parts into position to achieve a two bladed cartridge style shave head that is able to be loaded by the user and is reusable. For the act of loading a blade, the geometry of the shaving head front component acts as a punch and blade spacer while the shaving head back component acts as a die and blade retainer. The blade loading device functions to align an unbroken double edge safety razor blade and hold that blade in place as the breaking and loading action takes place. The blade loading device can also function as the breaking device in some embodiments. The assembled shaving head front and shaving head back components locate the broken blade into an orientation and position to achieve an assembly capable of shaving with the two cutting edges of the double-edge safety razor blade simultaneously.

Non-exhaustive objects of various aspects of the present disclosure include:

- breaking a double edge safety razor blade into two pieces using part of the shaving head assembly as a component involved in breaking the blade
  - a. using a press as a separate tool to break the double edge safety razor blade and then assembling the two pieces of the broken blade into a shaving head
  - b. breaking a double edge safety razor blade into two pieces using a shaving head assembly component as a brake press tool (a la a punch and die configuration)
  - c. breaking a double edge safety razor blade into two pieces using a shaving head assembly component and a breaking device together
  - d. to facilitate the breaking of a double edge safety razor blade, an "inflection point" or "break point" can be arranged in a head components or in a press tool
- a shaving head assembly having a cartridge design that holds a double edge safety razor blade broken into two pieces
- breaking the double edge safety razor blade slightly off-center along the long axis direction to some distance or percentage off the centerline. The distance off the centerline is related to the angle of attack of the blades (shaving angle) on the skin when in the operating position.

DETAILED DESCRIPTION

Figure 14:
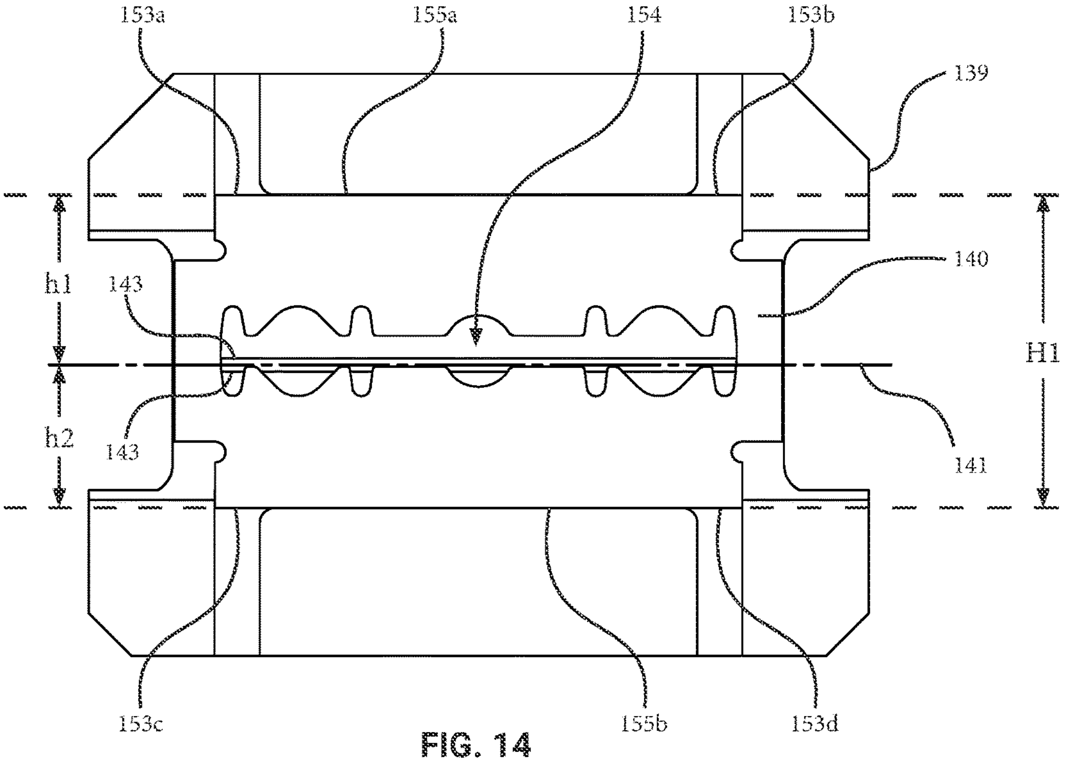
FIG. 14 is a top view of a manual brake press block with a double edge safety razor blade set into the starting position.

Referring to FIGS. 1A-1D, there is shown various views of the shaving head back component 109. The shaving head back component refers to the component that is attached to the handle of a shaving razor. Generally, back refers to an area or direction toward the handle, and front refers to an area or direction away from the handle toward a shaving interface with a user's skin. An angular locating surface 114 is positioned normal to a handle insertion pocket 111 giving the operator a visual cue for the proper insertion of multiple handle options. An undercut pocket 112 is located in a position that locks the handle into its operating position by way of an insertion and retention mechanism shown in FIGS. 10A, 10B, and 11. Notch details 121 and 122 are relief details that interface with the shaving head front component 108 shown in FIGS. 2A-2D. The shaving head front component refers to the component that is inserted into the shaving head back component 109 when the razor is loaded with a double edge safety razor blade 140 as seen in FIG. 14. The back mass 110 and front mass 113 form a slot 120 that serves multiple functions. First, the slot and its adjacent details can act as the die side of a double edge safety razor blade breaking process. Next, the slot and its adjacent details can act as a lead in or guide for a double edge safety razor blade element and shaving head front component 108 to be inserted into their operating position. Next the slot and corresponding details function as the retaining details for a double-edge safety razor blade elements 140, as seen in FIG. 14, and positioned in their operating positions along with the shaving head front component 108.

Referring now to FIGS. 2A-2D, there is shown various views of the shaving head front component 108. A retention guide and punch 117 functions as the punch side of a double edge safety razor blade breaking process. It also functions as a locating surface for the double edge safety razor blade elements operating position and a spacer to control the space between the double edge safety razor blade elements. Two double-edge safety razor blade element operating position stops 115 and 116 are positioned as shown to locate the cutting edge of the blade elements relative to blade guard side features 107, blade guard front features 118, and blade relief features 119.

Referring now to FIGS. 3A-3E and FIGS. 4A-4B, there is shown the shaving head front and shaving head back components assembled without a double-edge safety razor blade elements. The interfacing surfaces are shown where the retention guide and punch 117 and die 120 features intersect and come to rest in their operating positions where they function to retain the blade elements. Blade elements operating position stops 115 and 116 interfaces with notch details 121 and 122.

Referring now to FIGS. 5A-5E and FIG. 6, there is shown the shaving head front and shaving head back components 108, 109 assembled with a standard double edge safety razor blade 140 broken in two. The double edge safety razor blade 140 typically includes a cutout pattern 154 resembling that shown in FIG. 4, but in other implementations, the razor blade 140 can have a different lengthwise cutout pattern or patterns (e.g., multiple holes) through the central portion of the blade 140. The double-edge safety razor blade 140 includes a first sharp edge 155*a* and a second sharp edge 155*b* (shown in FIG. 14) on opposite sides of the blade 140. The safety razor long half 123 and short half 124 also referred to as blade elements or double edge safety razor blade elements, are retained by the blade slot 120 and the retention guide and punch 117, respectively. A typical height (or width, as differentiated from length) of a conventional double edge safety razor blade is 21.9 mm, which is the distance between the two blade edges. An example height of the long half 123, h1 (shown in FIG. 14) is about 11.6 mm, and an example height of the short half 124, h2, is about 10.3 mm (if the blade is broken at about 52.5%/47.5%), such that the sum of the heights of the long half 123 and the short half 124 (i.e., h1+h2) corresponds substantially to the height, H1, of the double edge safety razor blade in an unbroken configuration (such as can be seen in FIG. 14), resulting in a shaving angle, $\beta$, of about 30 degrees (see FIG. 24). Due to some slight bending that can occur at the break location, the heights h1, h2 of the long and short halves 123, 124 may be slightly smaller on the order of millimeters compared to in their unbroken form. In an alternate configuration, the blade 140 can be broken lengthwise exactly in half (the two half portions have a width 50%/50% compared to the original width), resulting in a 90 degree angle of attack, β. In a still further configuration, the blade 140 can be broken at 53.5%/46.5% such that h1=11.75 mm and h2=10.15 mm, resulting in a shaving angle, β, of about 20 degrees. In yet a further configuration, the blade 140 can be broken at 66%/34% such that h1=14.45 mm and h2=7.45 mm, resulting in an angle of attack, β, of about 5 degrees. Thus, the first portion of the blade 140 when broken into two portions can be between 50% and 66% of the entire original width of the blade 140, and the second portion can be correspondingly between 50% and 34%. The location and orientation of the blade elements relative to the handle interface surface 114 and the blade guard and blade relief details control the closeness to the skin and level of aggression of the shave. Variations of this embodiment alter the angle of attack, (3, of the two blade elements relative to the skin from approximately 5 degrees to approximately 30 degrees.

Figure 1A:
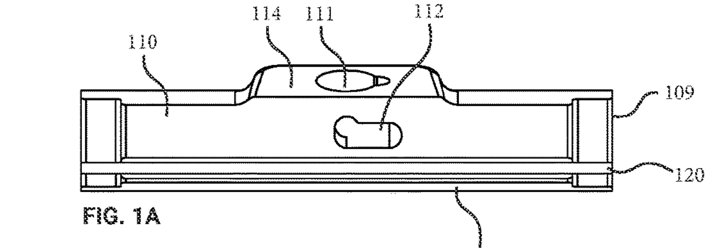
FIG. 1A is a front view of the shaving head back component.
Figure 1B:
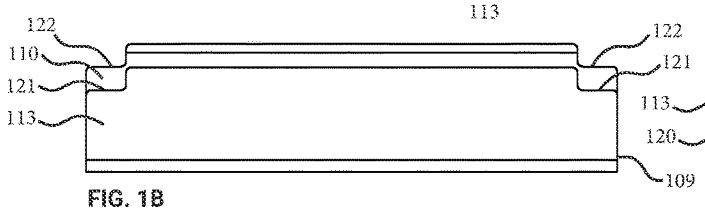
FIG. 1B is a top view of the shaving head back component.
Figure 1D:
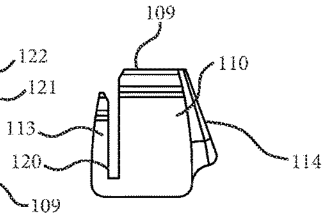
FIG. 1D is a right side view of the of the shaving head back component.
Figure 1C:
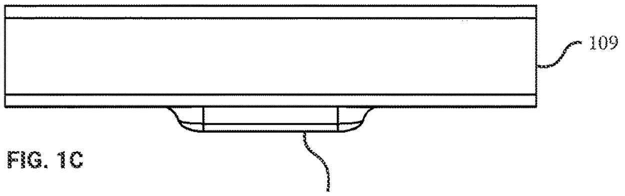
FIG. 1C is a back view of the shaving head back component.
Figure 2A:
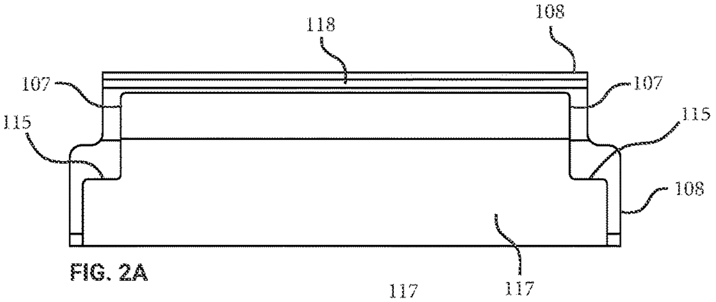
FIG. 2A is a top view of the shaving head front component.
Figure 2C:
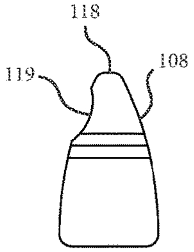
FIG. 2C is a right side view of the shaving head front component.
Figure 2D:
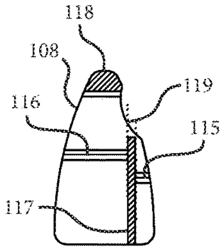
FIG. 2D is a section view of the shaving head front component.
Figure 2B:
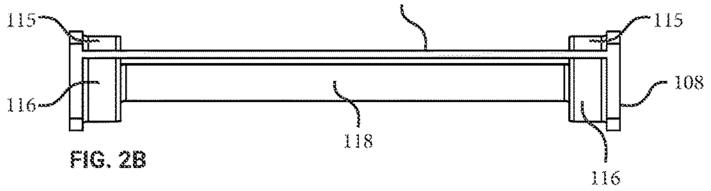
FIG. 2B is a front view of the shaving head front component.
Figure 3A:
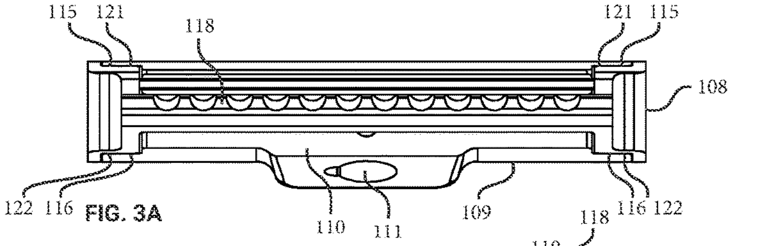
FIG. 3A is a front view of the shaving head front and shaving head back components assembled without double edge safety razor blade elements.
Figure 3B:
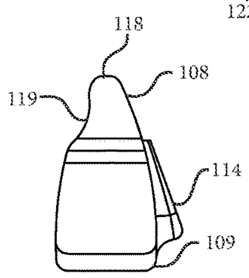
FIG. 3B is a left side view of the shaving head front and shaving head back components assembled without double edge safety razor blade elements.
Figure 3C:
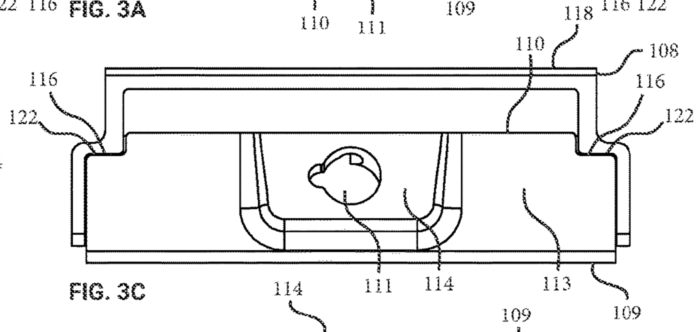
FIG. 3C is a top view of the shaving head front and shaving head back components assembled without double edge safety razor blade elements.
Figure 3D:
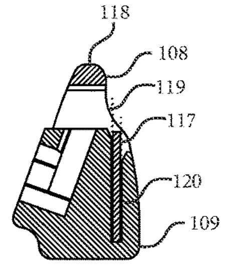
FIG. 3D is a section view of the shaving head front and shaving head back components assembled without double edge safety razor blade elements.
Figure 3E:
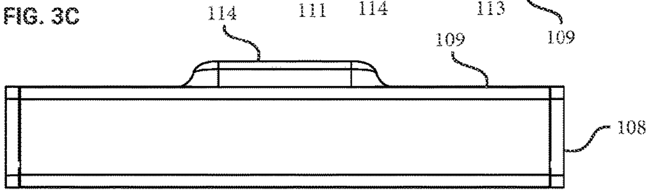
FIG. 3E is a back view of the shaving head front and shaving head back components assembled without a blade.
Figure 4A:
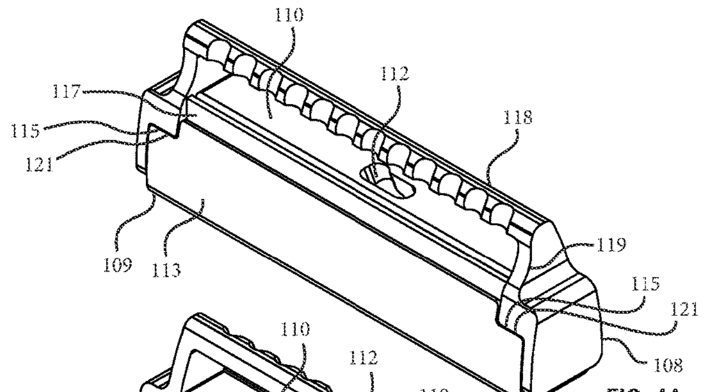
FIG. 4A is an isometric bottom side view of the shaving head front and shaving head back components assembled without double edge safety razor blade elements.
Figure 4B:
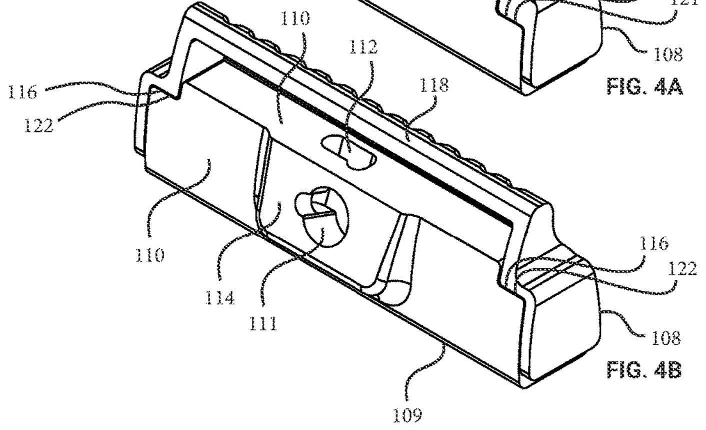
FIG. 4B is an isometric top side view of the shaving head front and shaving head back components assembled without double edge safety razor blade elements.
Figure 5A:
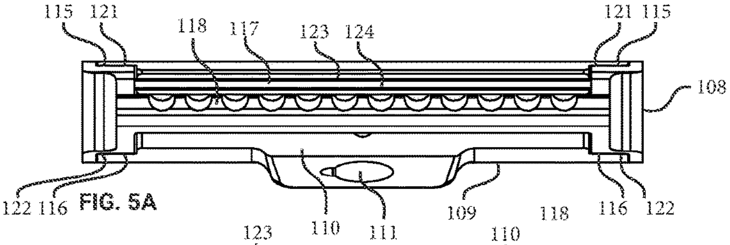
FIG. 5A is a front view of the shaving head front and shaving head back components assembled with double edge safety razor blade elements.
Figure 5B:
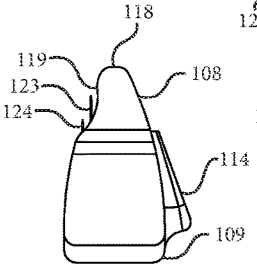
FIG. 5B is a left side view of the shaving head front and shaving head back components assembled with double edge safety razor blade elements.
Figure 5C:
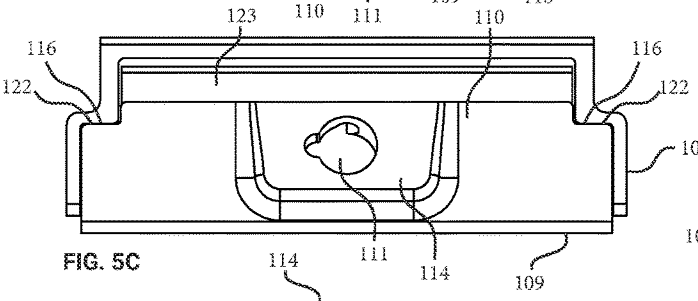
FIG. 5C is a top view of the shaving head front and shaving head back components assembled with double edge safety razor blade elements.
Figure 5D:
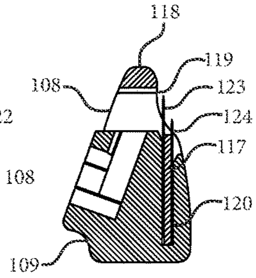
FIG. 5D is a section view of the shaving head front and shaving head back components assembled with double edge safety razor blade elements.
Figure 5E:
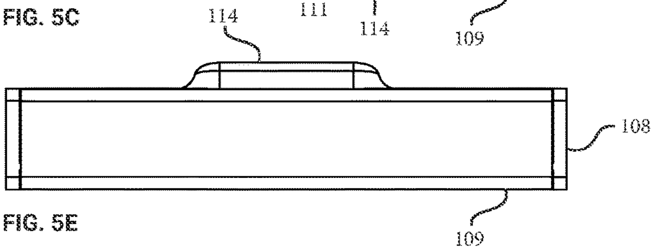
FIG. 5E is a back view of the shaving head front and shaving head back components assembled with double edge safety razor blade elements.
Figure 6:
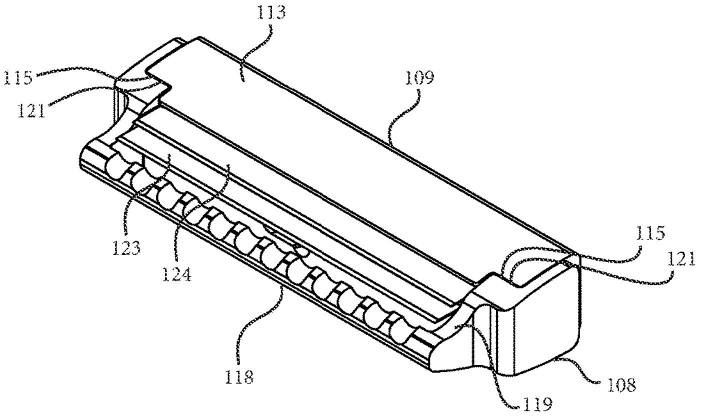
FIG. 6 is an isometric front view of the shaving head front and shaving head back components assembled with double edge safety razor blade elements.
Figure 7A:
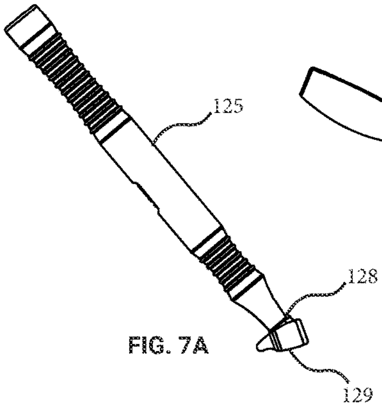
FIG. 7A is a side view of the shaving head front and shaving head back components assembled with a straight handle.
Figure 7B:
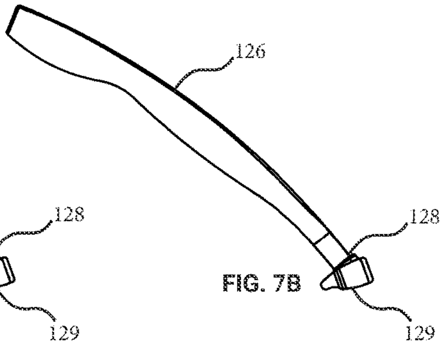
FIG. 7B is a side view of the shaving head front and shaving head back components assembled with a curved handle angled for face shaving.
Figure 7C:
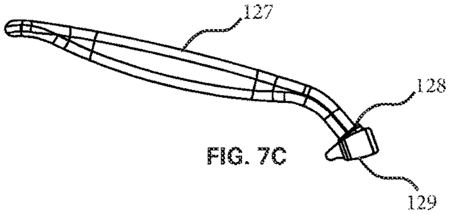
FIG. 7C is a side view of the shaving head front and shaving head back components assembled with curved handle angled for leg shaving.
Figure 8A:
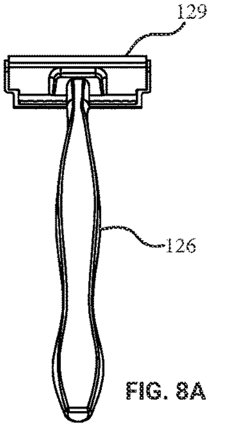
FIG. 8A is a top view of the shaving head front and shaving head back components assembled with a curved handle angled for face shaving positioned in its connected and operational position.
Figure 8B:
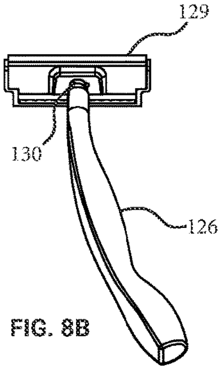
FIG. 8B is a top view of the shaving head front and shaving head back components assembled with a curved handle angled for face shaving rotated 90 degrees about the handle connection interface axis and aligned with the insertion details of the shaving head.
Figure 9A:
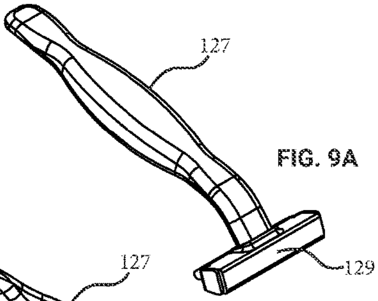
FIG. 9A is a front isometric view of the shaving head front and shaving head back components assembled with curved handle angled for leg shaving positioned in its connected and operational position.
Figure 9B:
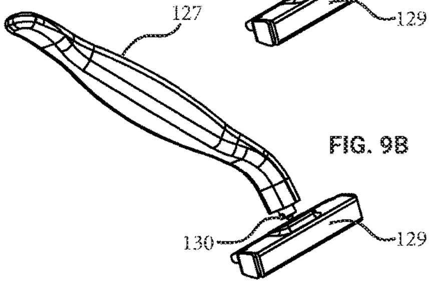
FIG. 9B is a front isometric view of the shaving head front and back components assembled with curved handle angled for leg shaving rotated 90 degrees about the connecting axis and aligned with the insertion details of the shaving head.

Referring now to FIGS. 7A-7C, there is shown the shaving head front and shaving head back components 108, 109 assembled with various examples of handle designs. The blade interface 128 is a common set of details that function to locate the assembled shaving head 129 in the most ergonomic angle of attack for different areas of the body. The blade interface 128 allows the universal use of the shaving head assembly 129 on any future designed handle with attributes that change the angle of the shaving head assembly while holding it in your hand. FIG. 7A illustrates a straight traditional handle 125 used for general purpose use where the operator has more control of the shaving angle than other options. FIG. 7B illustrates a curved handle 126 specifically designed for the ergonomics of shaving one's face. FIG. 7C illustrates an ergonomic handle with a more acute angle relative to the shaving head assembly 129 specifically designed for the ergonomics of shaving one's legs.

Referring now to FIGS. 8A-8B, and FIGS. 9A-9B, there is shown the shaving head front and shaving head back components assembled with examples such as handles 126 and 127 that require a specific final operating position. The handle interface details 130 lock into an operation position shown in FIG. 8A and FIG. 9A. The handle interface details 130 and handles 126 and 127 are rotated 90 degrees about the axis concentric axial receiver pocket 135 relative to the assembled head 129 for the function of inserting or removing the handles.

Figure 10A:
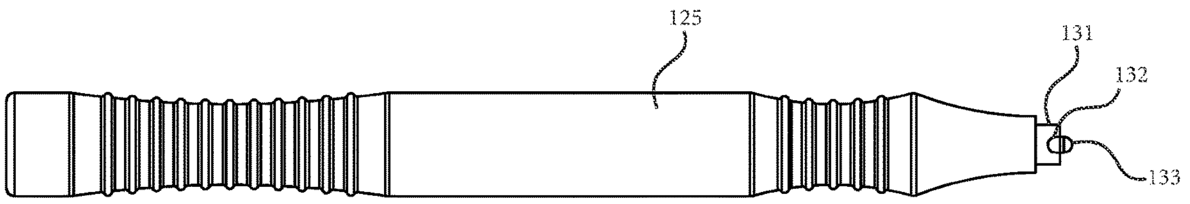
FIG. 10A is a top view of the straight handle and head assembly connection details.
Figure 10B:
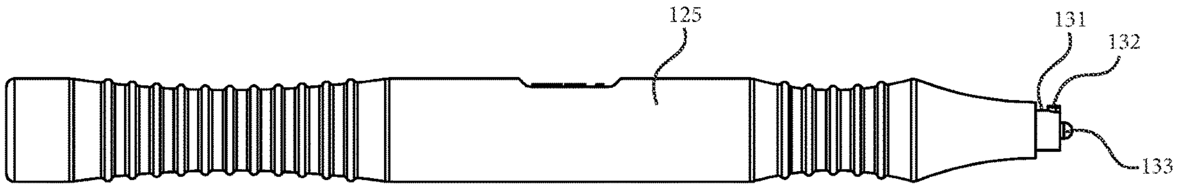
FIG. 10B is a side view of the straight handle and head assembly connection details.

Referring now to FIGS. 10A-10B, there is shown a straight traditional handle 125 with one embodiment of interface details including a handle interface axial tube 131 that has an orientation bump out detail 132 and a spring-loaded plunger 133.

Figure 11:
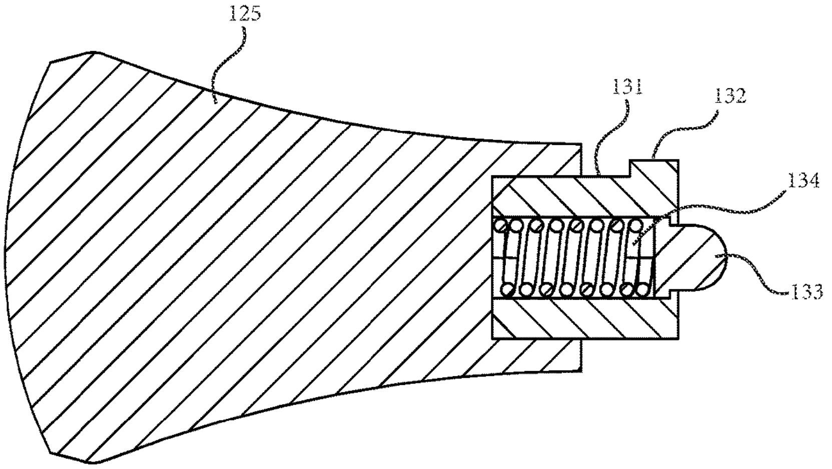
FIG. 11 is a section view of the straight handle with the head assembly connection mechanism.

Referring now to FIG. 11, there is shown a cross-sectional detail of the embodiment of interface details shown in FIG. 10. The interface axial tube 131 is pressed into a pocket in handle 125. The interface axial tube 131 contains an undercut detail that traps the plunger 133 in its extended position when loaded with a compression spring 134. In addition, a bump out detail 132 is shown protruding from one side of the interface axial tube 131.

Figure 12A:
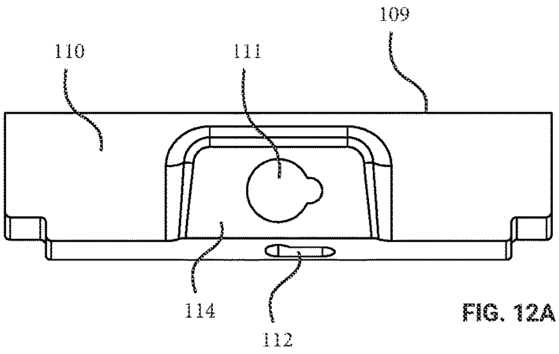
FIG. 12A is a view normal to the handle connection interface axis on the shaving head back component.
Figure 12B:
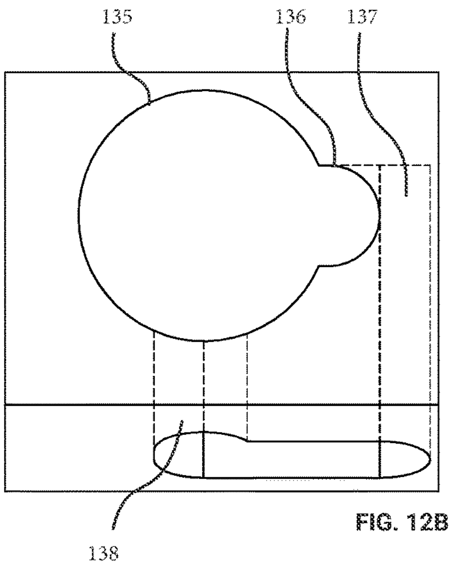
FIG. 12B is a detail view with hidden lines normal to the handle connection interface axis on the shaving head back component.

Referring now to FIGS. 12A-12B, there is shown the connection details on the shaving head assembly (back) side of the operating assembly from the handle insertion side. The axial receiver pocket 135 interfaces with the axial tube 131 with the bump out detail 132 aligned with the indexing pocket 136. The handle 125 and interface details 131, 132, 133, and 134 are pressed downward into the axial receiver pocket 135 until the bump out detail is below the undercut surface 137 of the interface locking pocket 112. This motion presses the plunger inwards loading the compression spring 134. The handle 125, now in tension, is rotated 90 degrees about the axis concentric with the axial receiver pocket 135 until the bump out detail 132 reaches and bottoms out on the side of the interface locking pocket 112. The loaded compression spring 134 pressing on the plunger 133 pushes the handle 125 in an outward direction against the bottom of the connection interface pocket 111 and pushes the bump out detail 132 into the locating detail detent 138 holding it under tension in the operating position.

Figure 13A:
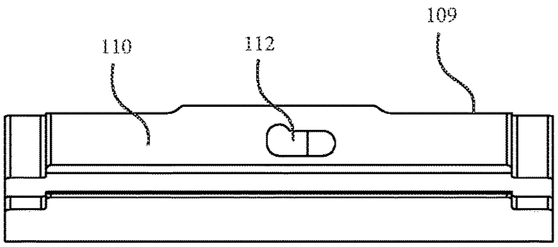
FIG. 13A is a view normal to the handle connection interface locking pocket on the shaving head back component.
Figure 13B:
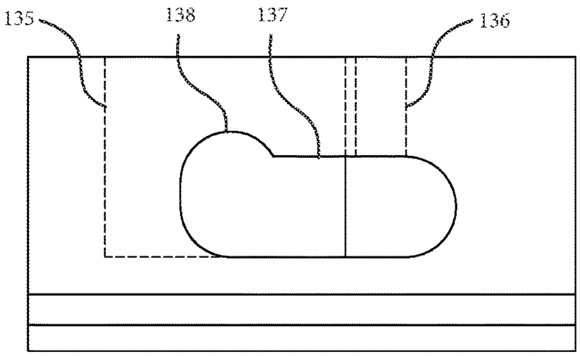
FIG. 13B is a detail view with hidden lines normal to the handle connection interface locking pocket on the shaving head back component.

Referring now to FIGS. 13A-13B, there is shown the undercut details on the shaving head assembly (back) side of the operating assembly from a direction normal to the bottom of the interface locking pocket.

Referring now to FIG. 14, there is shown an embodiment of a blade breaking component referred to as a manual blade retention block 139 with a standard double edge safety razor blade 140 resting in its starting position from the top. The manual blade retention block 139 is configured to retain an uncut standard double edge safety razor blade 140 in a secure position while the blade 140 is being broken to be formed into a two-blade shaving head. The centerline of bending and breaking 141 is centered between the inflection break points 143. The position of the centerline 141 relative to the half way point between the two cutting surfaces of the blade 140 will have a direct impact on the offset, angle of attack (3, and alignment of the blade in its operational position. The blade starting position and bending and breaking centerline will change to accomplish a range of operational angles between 5 and 30 degrees.

Figure 15A:
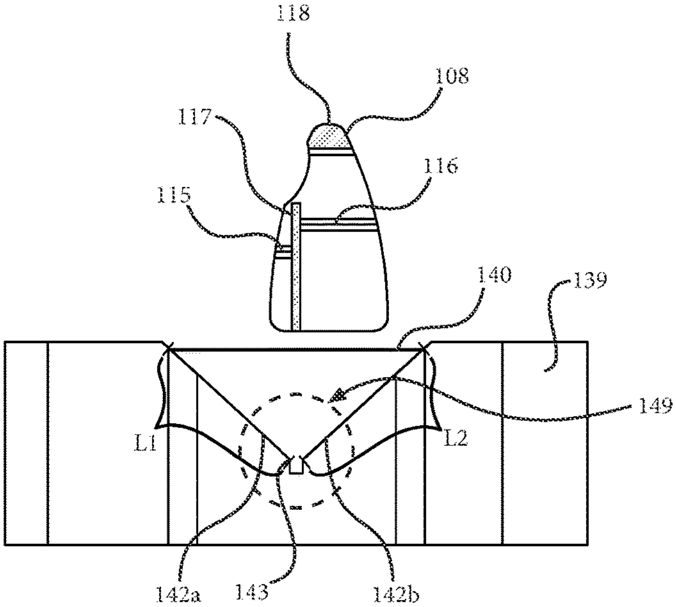
FIG. 15A is a side view of a manual brake press block with a double edge safety razor blade set into the starting position and a section view of the shaving head front component in its starting position.
Figure 15B:
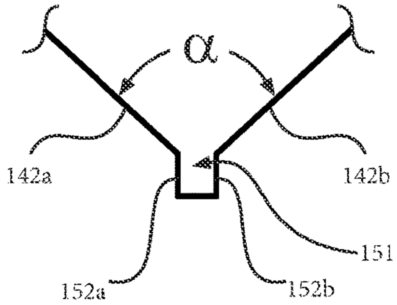
FIG. 15B is an enlarged view of a lower portion of the manual brake press block shown in FIG. 15A.

Referring now to FIG. 15A, there is shown an embodiment of a blade breaking component referred to as a manual blade retention block 139 with a standard double edge safety razor blade 140 resting in its starting position from the side. The shaving head front component 108 is positioned in its starting position for a blade break. This position centers the upper retention guide and punch 117 over the blade centerline of bending and breaking 141. A length, L1, of a first sloped guide 142*a* can be different from a length, L2, of a second sloped guide 142*b*. Example dimensions of L1 and L2 being 11.3 mm (0.445 in) (L1=L2). The first sloped guide surface 142*a* has a first end and a second end, and the second sloped guide surface 142*b* also has a corresponding first end and a second end. The second end of the first sloped guide surface 142*a* and the second end of the second sloped guide surface 142*b* converge to form a channel 151 (seen in FIG. 15B) below the second end of the first guide sloped surface 142*a* and the second end of the second guide sloped surface 142*b*. An angle, a, formed by the first sloped guide surface 142*a* and the second sloped guide surface 142*b* is between 75 to 120 degrees or between 45 and 179 degrees or about 84 to 96 degrees. The channel 151 has opposing parallel surfaces 152*a*, 152*b* orthogonal to a plane defined by the first end of the first sloped guide surface 142*a* and the first end of the second sloped guide surface 142*b*. The channel is positioned off-center (see FIG. 14) relative to a midpoint between the first end of the first sloped guide surface 142*a* and the first end of the second sloped guide surface 142*b* so that respective lengths, L1, L2, between the first and second ends of the first sloped guide surface 142*a* and the first and second ends of the second sloped guide surface 142*b* are unequal.

Registration members 153*a*, 153*b*, 153*c*, 154*d* (seen in FIG. 14) are arranged relative to the first sloped guide surface 142*a* and the second sloped guide surface 142*b* to receive a double-edge safety razor blade 140 across an opening 149 formed by the sloped guide surfaces 142*a*, 142*b* (shown in FIG. 15A).

Figure 16:
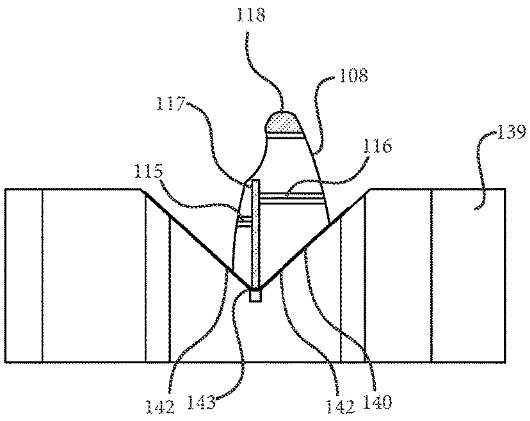
FIG. 16 is a side view of a manual brake press block with a section view of the shaving head front component pressing the double-edge safety razor blade into the bent position against the profile of the manual brake press.

Continuing now to FIG. 16, there is shown the shaving head front component 108 moving down and pressing down on the double edge safety razor blade 140 until it reaches a bent position against blade bend guide surfaces 142 of the manual blade retention block 139.

Figure 17:
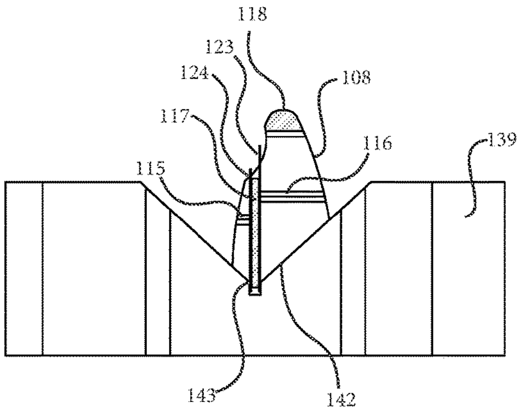
FIG. 17 is a side view of a manual brake press block with a section view of the shaving head front component pressing the double edge safety razor blade into the break position against the center profile of the manual brake press.

Continuing now to FIG. 17, there is shown the shaving head front component 108 moving past or beyond the press inflection points and breaking the double edge safety razor blade into blade elements 123 and 124, a long side 123 and a short 124 side. This action also snaps the blade elements in a rotational motion towards the upper retention guide and punch 117 and coming to rest just below their operating positions. This is where the blade breaking process ends when using the manual brake embodiment of the disclosure. In this embodiment, the shaving head front component with blade elements must be manually inserted in the shaving head back component as shown in its final position in FIG. 24. In other aspects, the blade breaking process can be carried out using an automatic brake device so that the operator does not touch the safety blade while it is being broken into two pieces and secured into the head component.

Figure 18A:
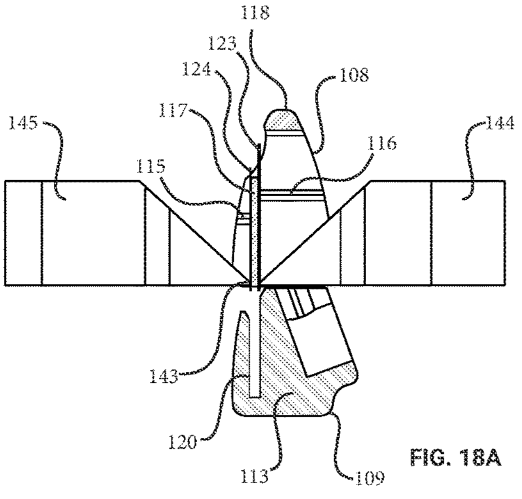
FIG. 18A is a side view of the automatic brake press blocks with a section view of the shaving head front component in the break position of the double edge safety razor blade and the shaving head back component in the receiving position.
Figure 18B:
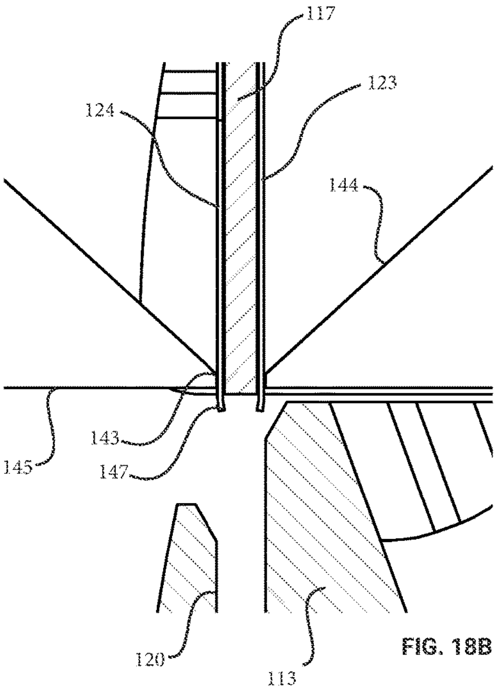
FIG. 18B is a close-up of the side view of the automatic brake press blocks with a section view of the shaving head front component in the break position of the double edge safety razor blade and the shaving head back component in the receiving position.

Continuing now to FIGS. 18A-18B, there is shown an alternative embodiment of a blade breaking and blade alignment component referred to as an automatic blade retention block at the same post blade break position as FIG. 17. In this embodiment, there are separate press blocks. A long side block or set of blocks 144 and a short side block or set of blocks 145. The geometry of the pre break steps are the same as the manual embodiment and FIGS. 18A-18B show the automatic press at the post break step. The long 144 and short 145 blocks act as both a die side of the mechanism for breaking and as retainers for the razor blade long side 123 and short side 124 through otherwise unsupported parts of the insertion process. A detailed view FIG. 18B details the resulting broken razor end details. After being broken, the typically hardened steel blade elements will retain a slight curved deformation that resides just under the retention guide and punch 117. The shaving head back component 109 is positioned below the inflection break point 143 with the blade slot 120 centered on the retention guide and punch 117.

Figure 19A:
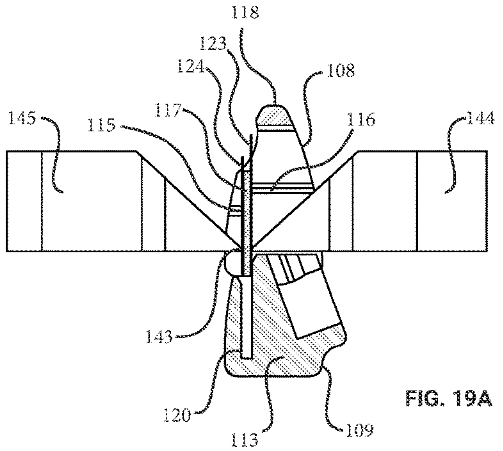
FIG. 19A is a side view of the automatic brake press blocks with a section view of the shaving head front component positioned just above the insertion position of the double edge safety razor blade elements into the shaving head back component with the double edge safety razor blade elements slid upwards into their operating positions.
Figure 19B:
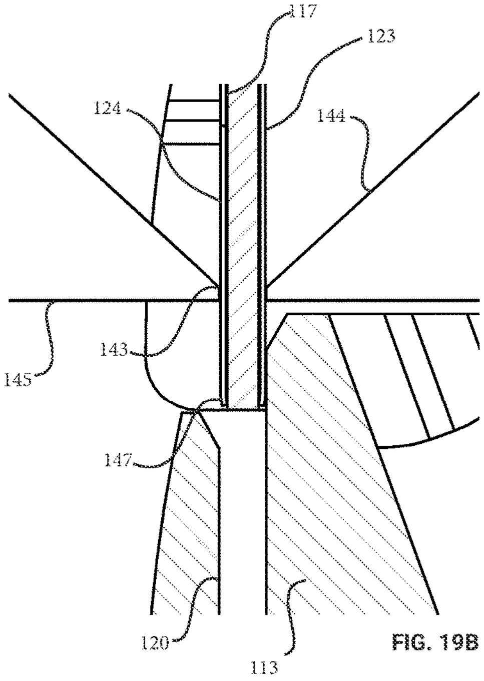
FIG. 19B is a close-up of the side view of the automatic brake press blocks with a section view of the shaving head front component positioned just above the insertion position of the double edge safety razor blade elements into the shaving head back component with the double edge safety razor blade elements slid upwards into their operating positions.

Continuing now to FIG. 19A, there is shown an automatic blade retention block embodiment with the blade continuing down towards the shaving head back component blade slot 120. In this position the block short 145 and long side 144 retains the broken blade elements against the brake die and retention guide and punch 117. FIG. 19B illustrates a detail view showing that the pressure from the block short and long sides moves the long and short blade halves upward relative to the shaving head front head's retention guide and punch 117 with both blade elements coming to a stop against the operation position stops 115 and 116.

Figure 20:
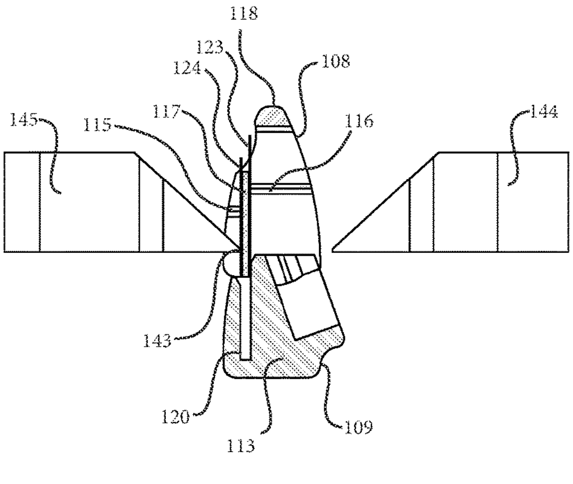
FIG. 20 is a side view of the automatic brake press blocks with a section view of the shaving head front component positioned after the back insertion position of the double edge safety razor blade elements into the shaving head back component with the double edge safety razor blade elements slid upwards into their operating positions and the back brake press block moved away from the head.

Continuing now to FIG. 20, there is shown the blade in the same location as shown in FIG. 19 with the automatic press block long side 144 sliding away from the head transferring the retention function of the blade elements from the block to the shaving head back lower brake die and blade slot 120.

Figure 21:
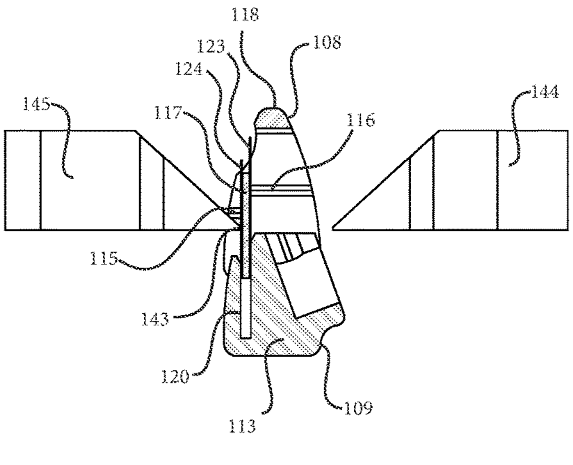
FIG. 21 is a side view of the automatic brake press blocks with a section view of the shaving head front component positioned after the front insertion position of the double-edge safety razor blade elements into the shaving head back component with the double edge safety razor blade parts slid upwards into their operating positions.

Continuing now to FIG. 20 and FIG. 21, there is shown the blade elements moved down towards the front of blade slot 120 while the press block short side 145 retains the short half of the blade 124.

Figure 22:
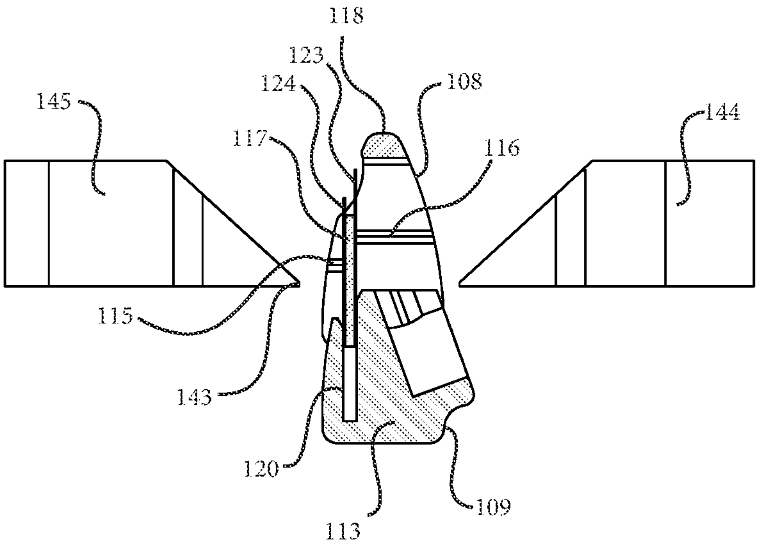
FIG. 22 is a side view of the automatic brake press blocks with a section view of the shaving head front component positioned after the front insertion position of the double edge safety razor blade elements into the shaving head back component with the double edge safety razor blade elements slid upwards into their operating positions and the front brake press block moved away from the head.

Continuing now to FIG. 22, there is shown the blade in the same position as FIG. 21 and with the automatic press block short side 145 sliding away from the head transferring the retention function of the blade to the shaving head back lower brake die and blade slot 120.

Figure 23:
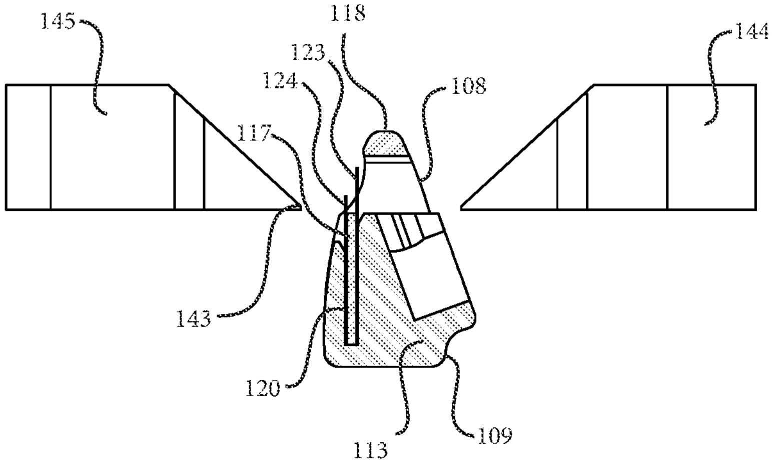
FIG. 23 is a side view of the automatic brake press blocks with a section view of the shaving head front component positioned in the final operational insertion position of the double-edge safety razor blade elements into the shaving head back component with the double edge safety razor blade elements slid upwards into their operating positions with the front and back brake press blocks moved away from the head.

Referring to FIG. 23, there is shown the blade elements and shaving head front component moved down into their final operating position.

Figure 24:
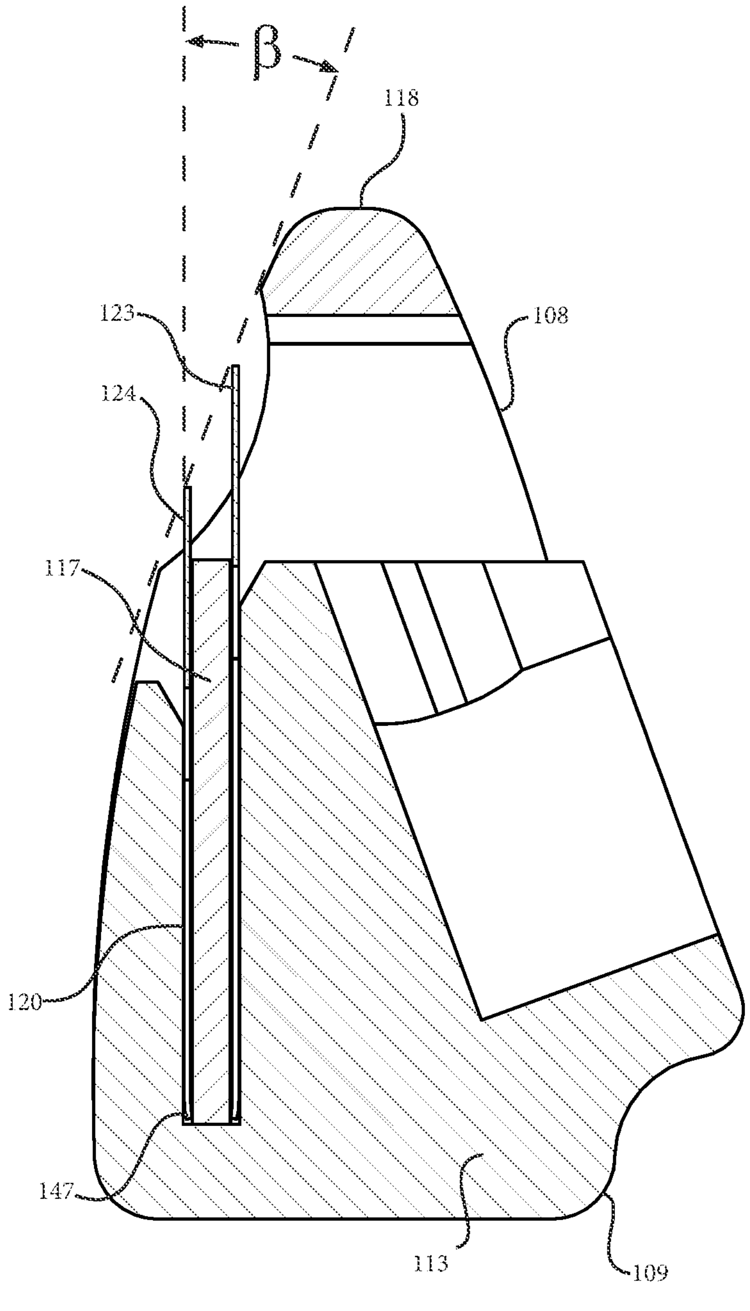
FIG. 24 is a side view of the automatic brake press blocks with a section view of the shaving head front component positioned in the final operational insertion position of the double-edge safety razor blade elements into the shaving head back component with the double edge safety razor blade elements slid upwards into their operating positions.

Referring to FIG. 24, there is shown a detailed view of the head assembly with blade. The broken razor end detail 147 has been forced down into the blade slot 120. The resulting shape from breaking the typically hardened steel double edge safety razor blade acts as a piece of spring steel against the blade slot 120 and retention guide and punch 117. This pressure acts to hold the shaving head front and shaving head back components together in their operating state.

Figure 25:
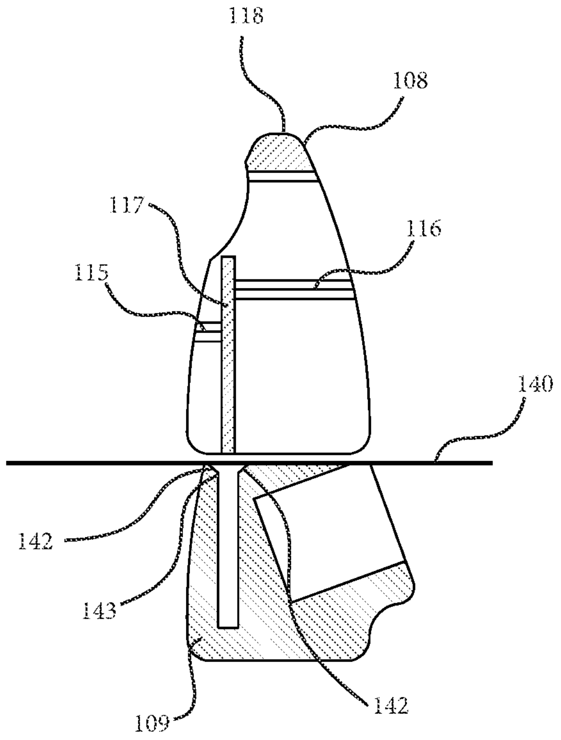
FIGS. 25, 26, and 27 show an alternative embodiment of a double edge safety razor blade breaking method and apparatuses using only the shaving head front component and shaving head back component for all double edge safety razor blade locating, breaking, and insertion functions.
Figure 26:
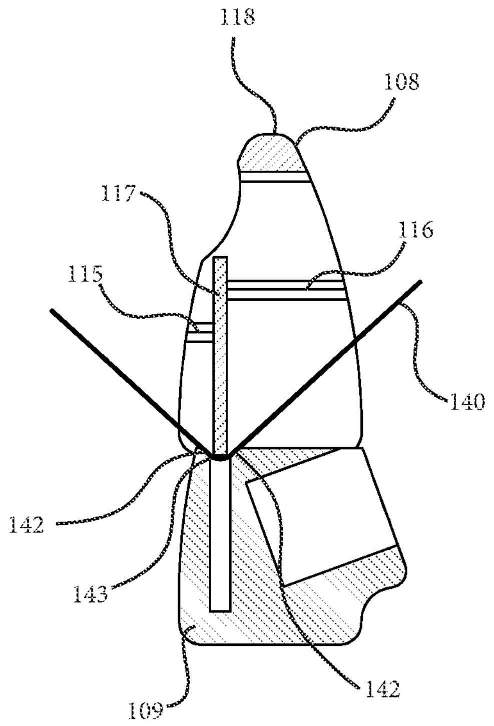
Figure 27:
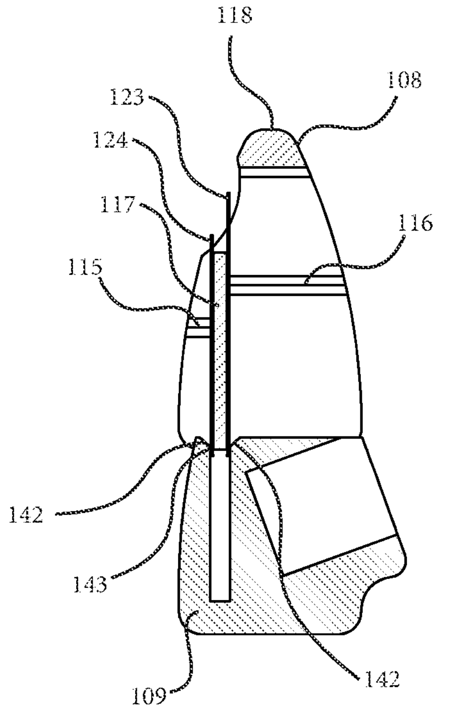
Figure 28:
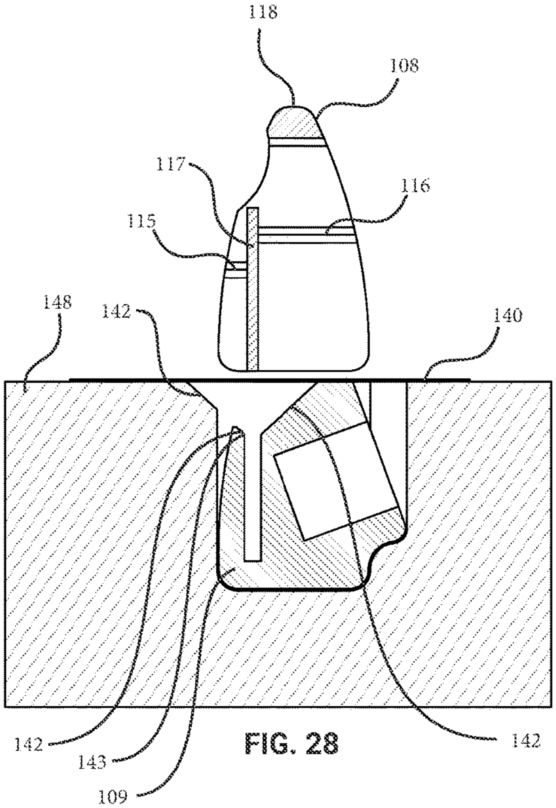
FIGS. 28, 28A-28C, FIGS. 29, 29A-29B, and FIGS. 30, 30A-30B show an alternative embodiment of a double edge safety razor blade breaking method and apparatuses using the shaving head front component and shaving head back component for the double edge safety razor blade breaking and insertion functions while using a separate double edge safety razor blade alignment component for double edge safety razor blade positioning and alignment.

Referring to FIG. 25, FIG. 26, and FIG. 27, there is shown an alternative embodiment of an automatic blade breaking method using only the shaving head front component 108 and shaving head back component 109 for all blade locating, blade breaking, and blade insertion functions.

Figure 29:
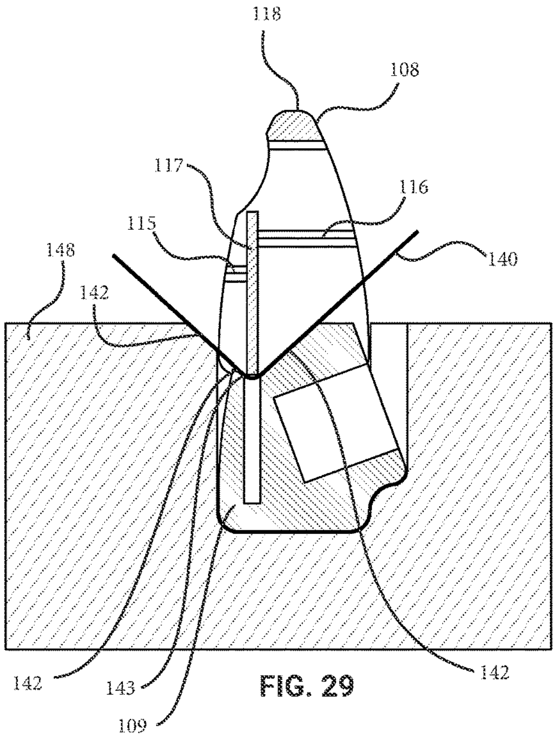
Figure 30:
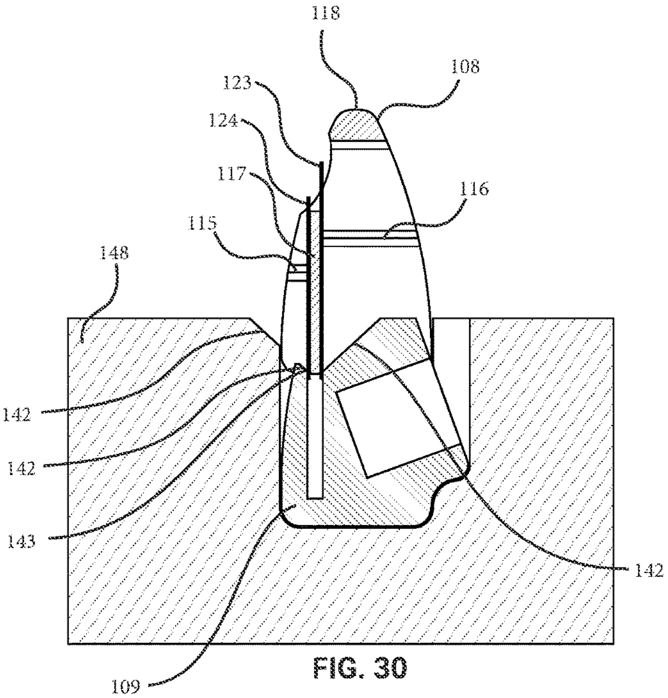
Figure 28A:
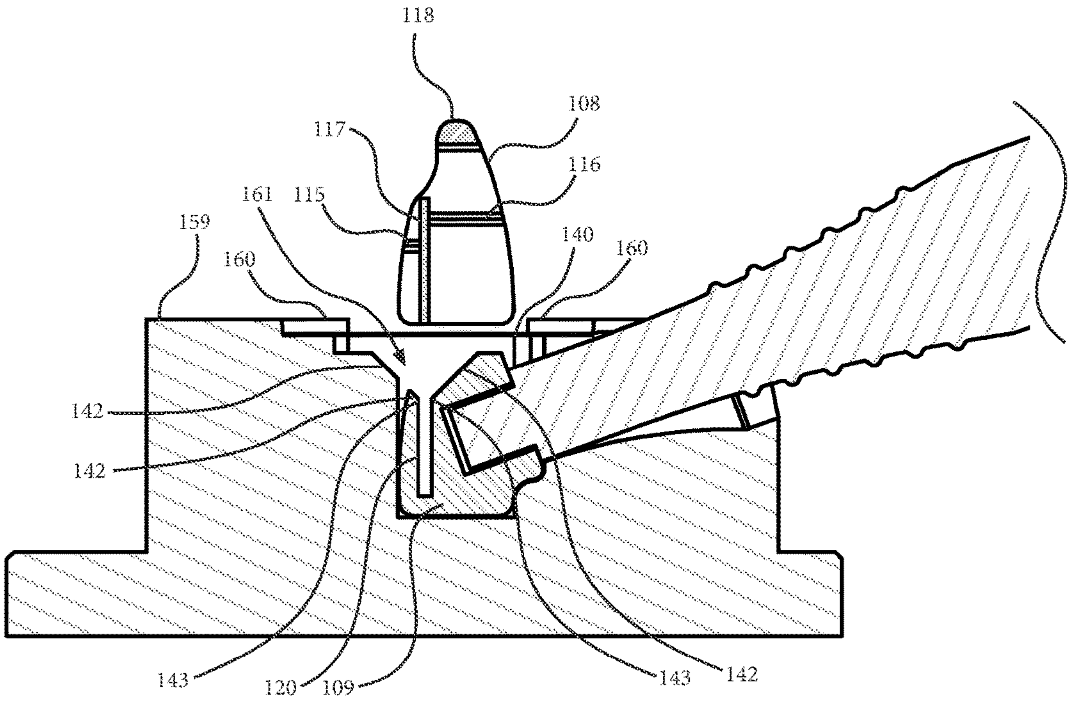
Figure 28B:
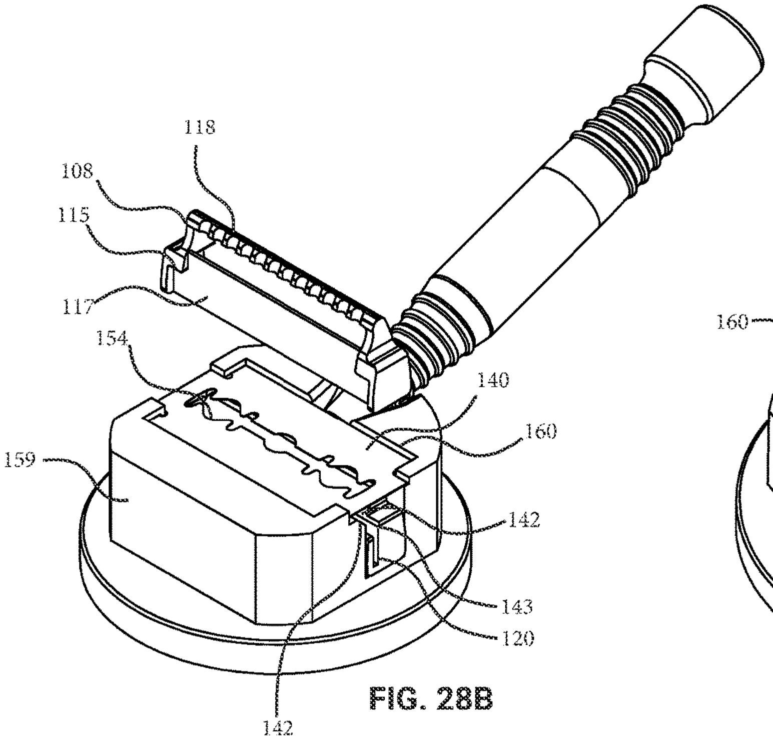
Figure 28C:
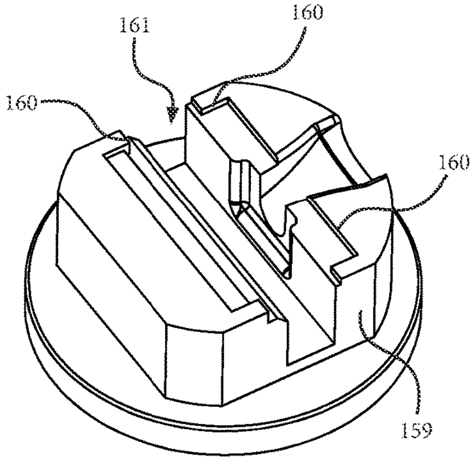
Figure 29A:
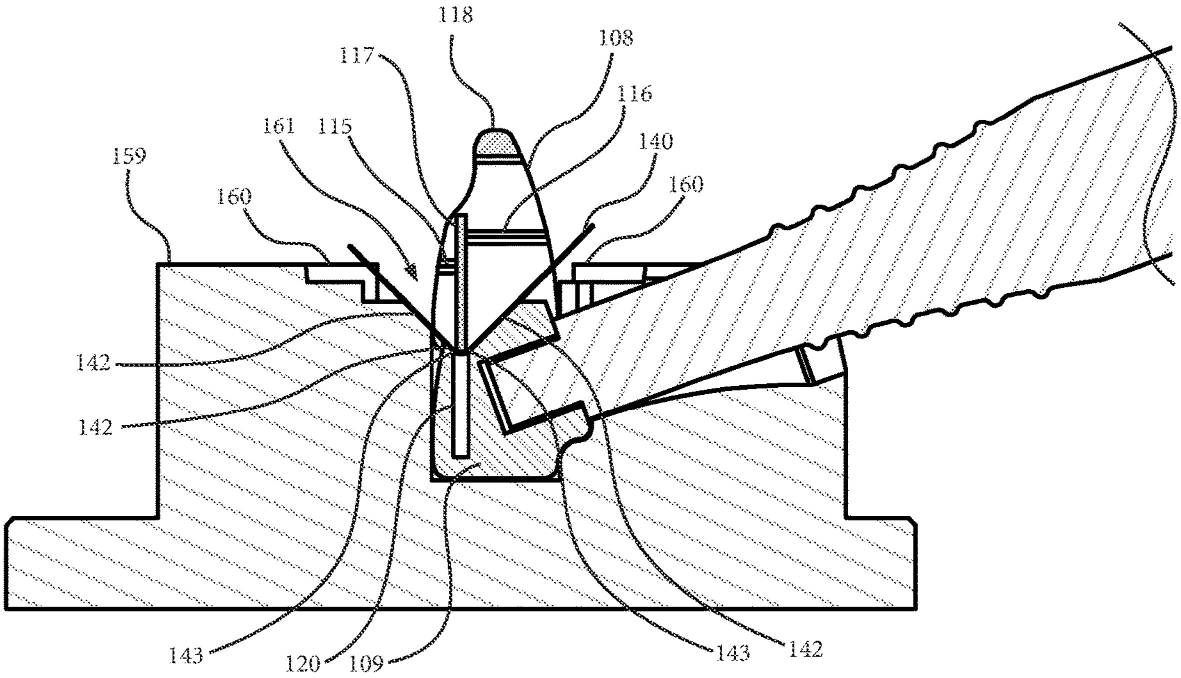
Figure 29B:
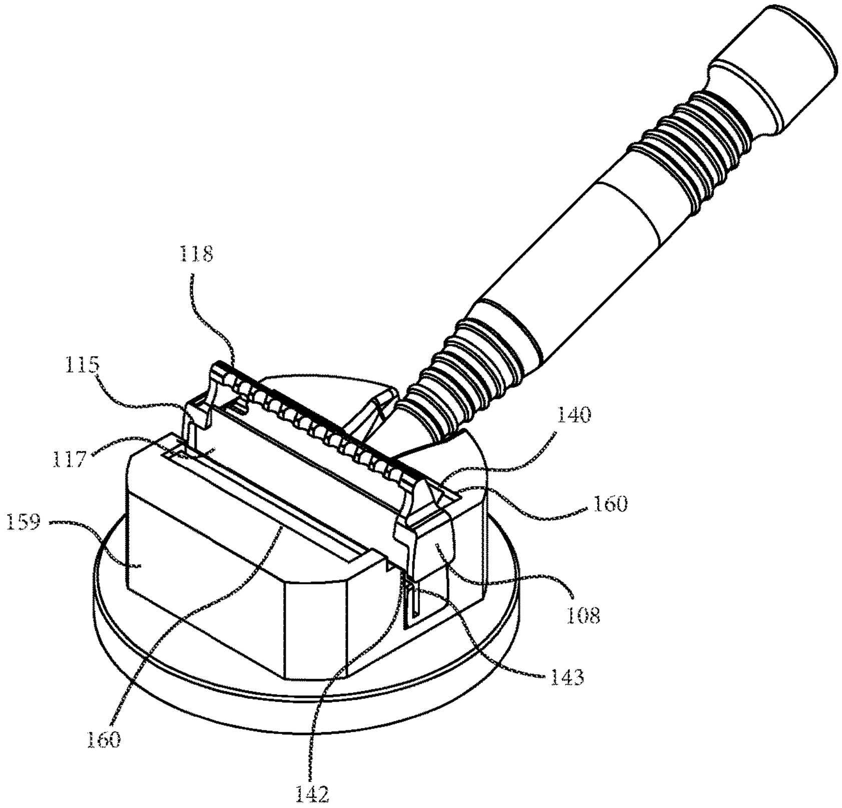
Figure 30A:
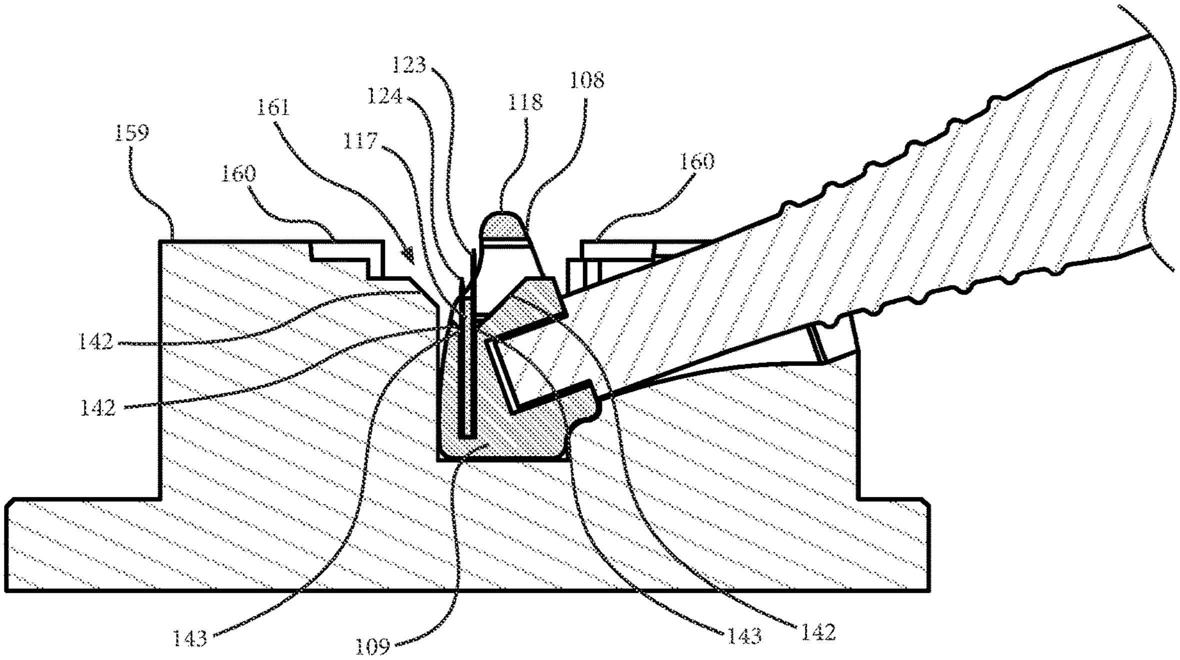
Figure 30B:
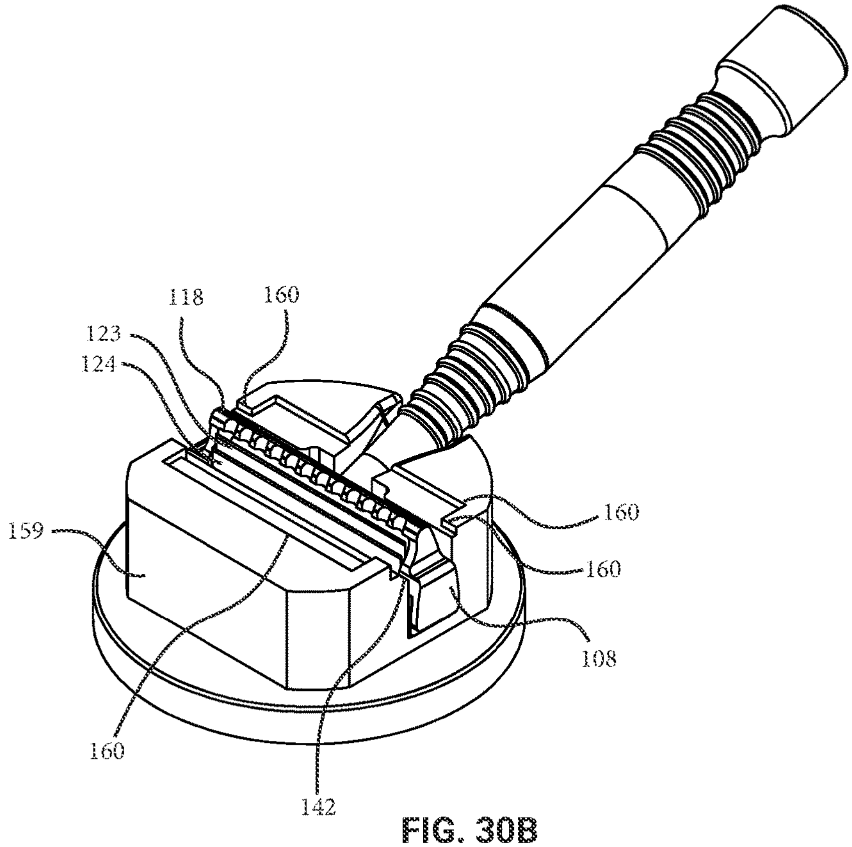

Referring to FIGS. 28A-28C, FIGS. 29A-29B, and FIGS. 30A-30B, there is shown an alternative embodiment of an automatic blade breaking method using the shaving head front component 108 and shaving head back component 109 for the blade breaking and insertion functions while using a separate blade alignment component 159 for blade positioning and alignment. A press block 159 has one or more registration features 160 configured to hold the double edge safety razor blade in its original, flat, unbroken, and unbent form 140 relative to the press block 159. For example, the registration feature 160 can be a pocket formed by one vertical wall or a number of segmented vertical walls that align to both cutting edges of the double edge safety razor blade in order to register the blade in the direction of its short axis. The registration feature 160 can also include one or more vertical walls or segments of walls that align to surfaces on both sides of, and perpendicular to, the cutting edge of the double edge safety razor blade in order to register the blade in the direction of its long axis. The press block 159 includes a conformal recess 161 configured to receive snugly therein the shaving head back component 109 to keep the shaving head back component 109 in a secure position while the doubled edge safety razor blade 140 is broken into two elements by the movement of the shaving head front component 108 toward the shaving head back component 109 as shown in FIGS. 29 and 30. The sloped guide surfaces 142 are integrated into the shaving head back component 109 as well as the press block forming angle, a (refer to FIG. 15B). The inflection break point 143 is integrated into the shaving head back component 109. As the shaving head front component 108 and unbroken double edge safety razor blade 140 moves past the inflection break point 143, the blade breaks and rotates into its operating position relative to the shaving head front component 108. As the shaving head front component continues down into its operating position, the safety razor long half 123 and safety razor short half 124 are held in place by the blade slot 120 and the blade retention guide and punch 117.

Figure 31A:
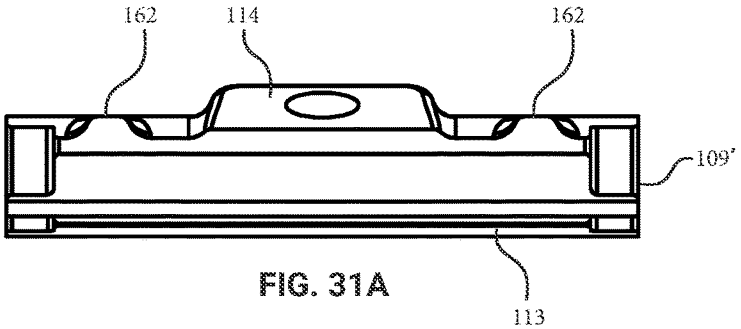
FIGS. 31A-31C show an alternative embodiment of the shaving head back component adding a bump out shape forming a vertical surface on the handle side of the component.
Figure 31B:
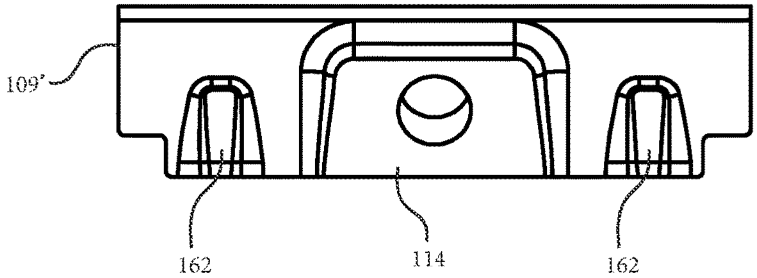
Figure 31C:
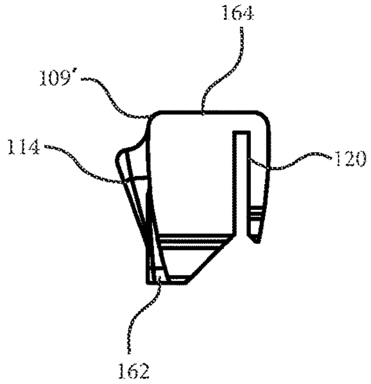

Referring to FIG. 31A-31C there is shown an alternative embodiment of the shaving head back component 109' with vertical locating tabs 162 added to the handle side of the shaving head back component 109'. The vertical locating tabs 162 form a surface that is parallel to the long axis of the blade slot 120.

Figure 32A:
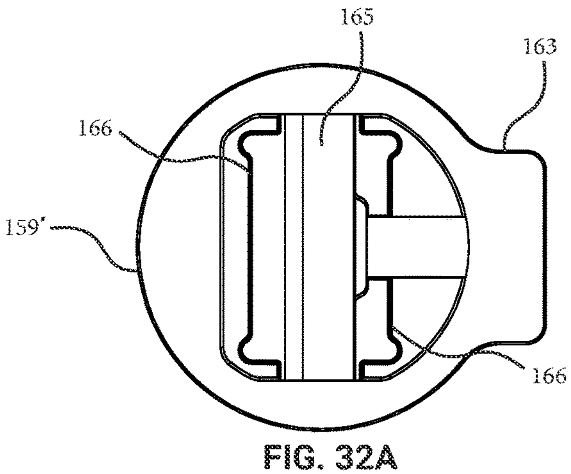
FIGS. 32A-32C show an alternative embodiment of the separate double edge safety razor blade alignment component.
Figure 32B:
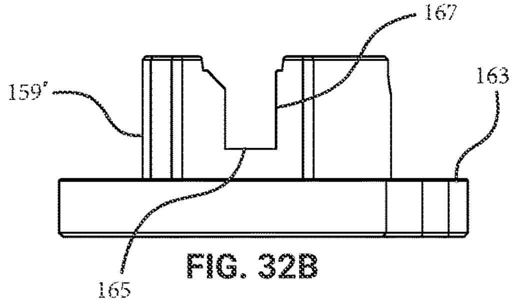
Figure 32C:
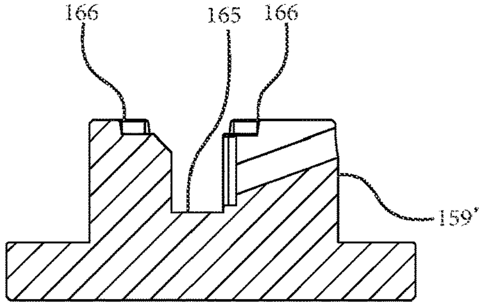

Referring to FIG. 32A-32C there is shown an alternative embodiment of a press block 159' with the same razor blade and shaving head back component retention features as the press block 159 found in FIGS. 28A-2C, FIGS. 29A-29B, and FIGS. 30A-30B and with the addition of a press block protrusion 163 positioned to stabilize the press block 159' while it is loaded with the shaving head back component 109' and handle. There is also shown an alternative embodiment of the registration features 166 with the addition of draft added to the vertical surfaces of the registration features 166.

Figure 33:
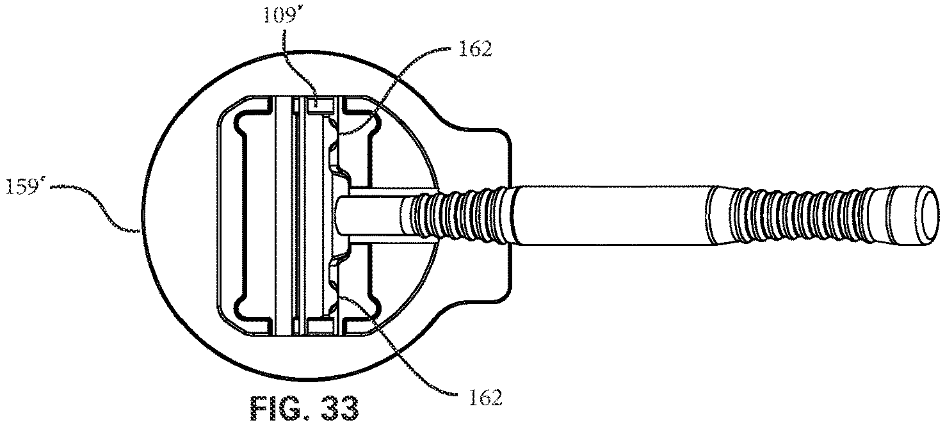
FIG. 33 shows an alternative embodiment of the separate double edge safety razor blade alignment component with the shaving head back component and handle positioned in a preloaded resting position from a top view.
Figure 34:
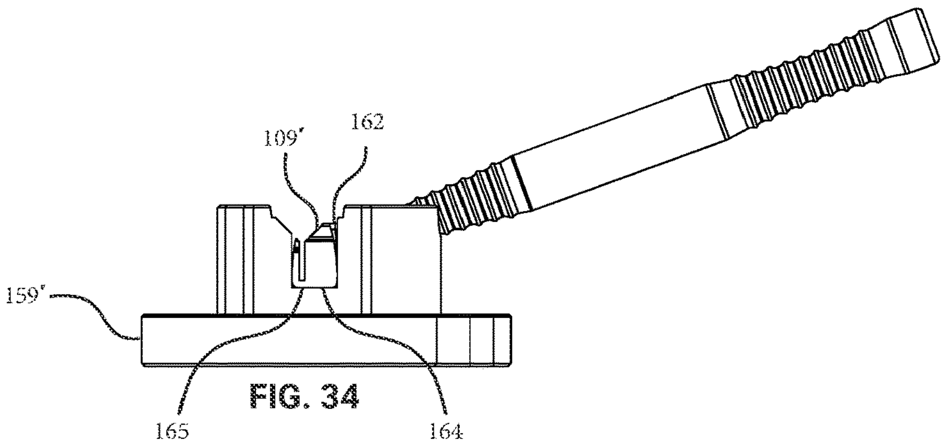
FIG. 34 shows an alternative embodiment of the separate double edge safety razor blade alignment component with the shaving head back component and handle positioned in a preloaded resting position from a side view.

Referring to FIGS. 33 and 34 there is shown the press block 159' with an alternative embodiment of the shaving head back component 109' with vertical locating tabs 162 in pre blade loading position. The press block head retention slot bottom surface 165 functions as a floor for the shaving head back component horizontal surface 164. While the press block head retention slot bottom surface 165 is coincident with the shaving head back component horizontal surface 164, the vertical locating tabs 162 are parallel and coincident to the press block head retention slot vertical surfaces 162 resulting in the retention of the shaving head back component 109' in an accurate pre blade loading position.

Figure 35A:
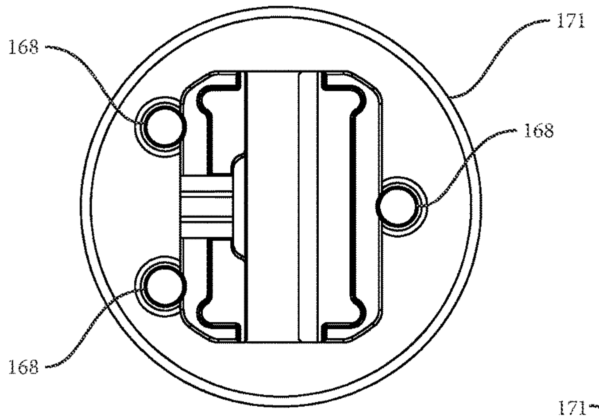
FIGS. 35A-35C show an alternative embodiment of a separate double edge safety razor blade and shaving head back alignment component.
Figure 35C:
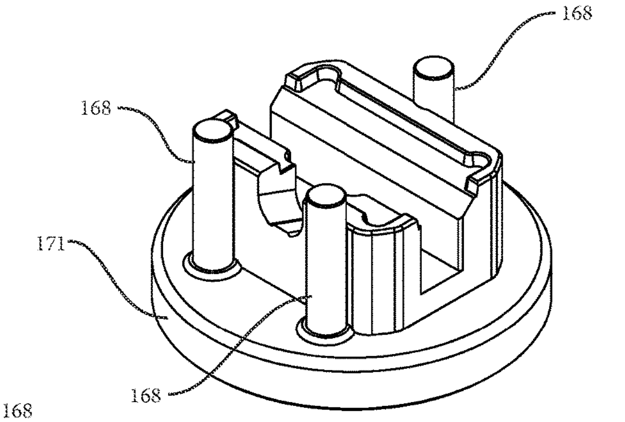
Figure 35B:
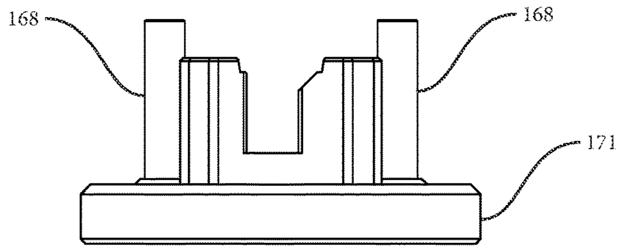

Referring to FIG. 35A-35C there is shown an alternative embodiment of a press block 171 with the same razor blade and shaving head back component retention features as the press block 159 found in FIGS. 28A-2C, FIGS. 29A-29B, and FIGS. 30A-30B. The press block 171 includes the addition of guide pins 168 that are composed of a different material than that of the press block 171 and of shaving head front retention ring 172 such that the differential material facilitates registration of the press block 171 relative to the shaving head front alignment component 172.

Figure 36A:
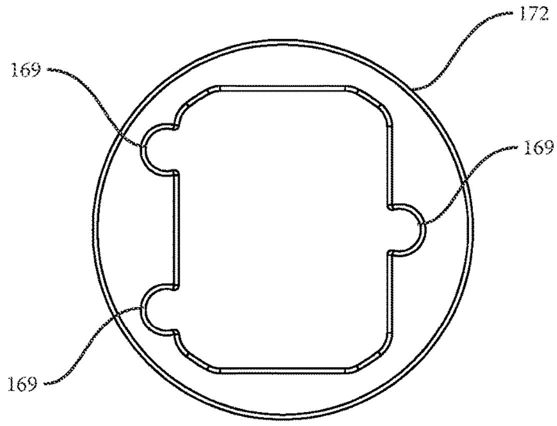
FIGS. 36A-36B show a top and isometric view of a shaving head front component alignment component.
Figure 36B:
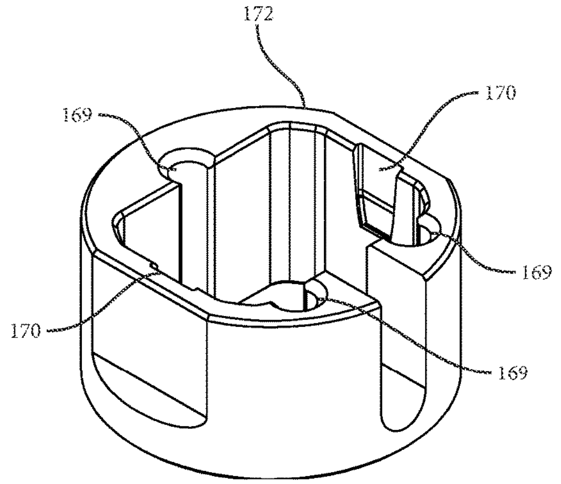
Figure 38A:
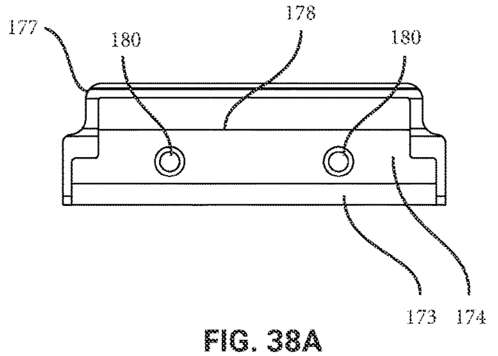
FIGS. 38A-38B, and FIGS. 39A-39C show an alternative embodiment of a shaving head front component with separate blade breaking and blade retention features as well as different materials or finishes.
Figure 38B:
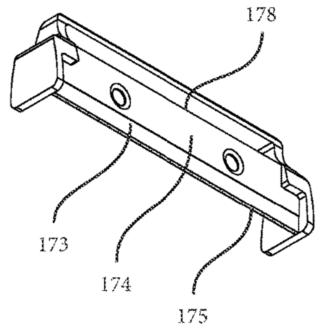
Figure 39A:
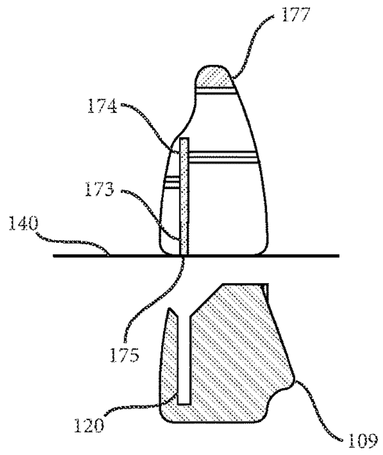
Figure 39B:
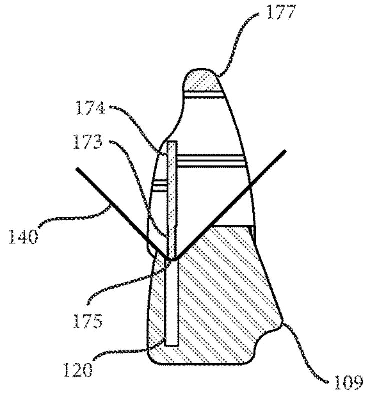
Figure 39C:
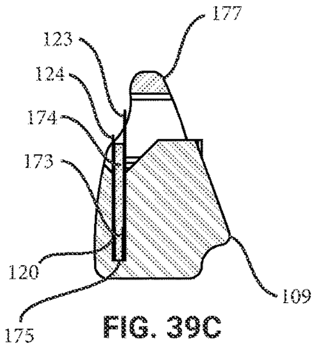
Figure 40A:
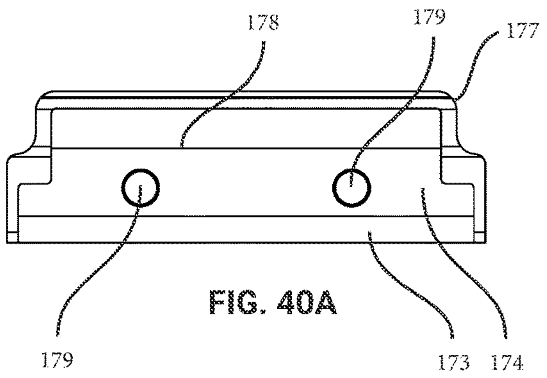
FIGS. 40A-40B and 41A-41C show an alternative embodiment of a shaving head front component with additional added on retention features of a different material and durometer.
Figure 40B:
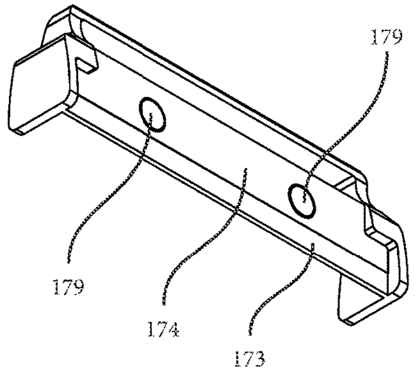

Referring to FIG. 36A-36B there is a shown a shaving head front alignment component 172 with guide rail details 169 integrated into the front alignment component 172. Also present are shaving head front retention details or recesses 170 that function to retain the shaving head front 177 (see FIG. 38A) in proper alignment for blade loading.

Figure 37A:
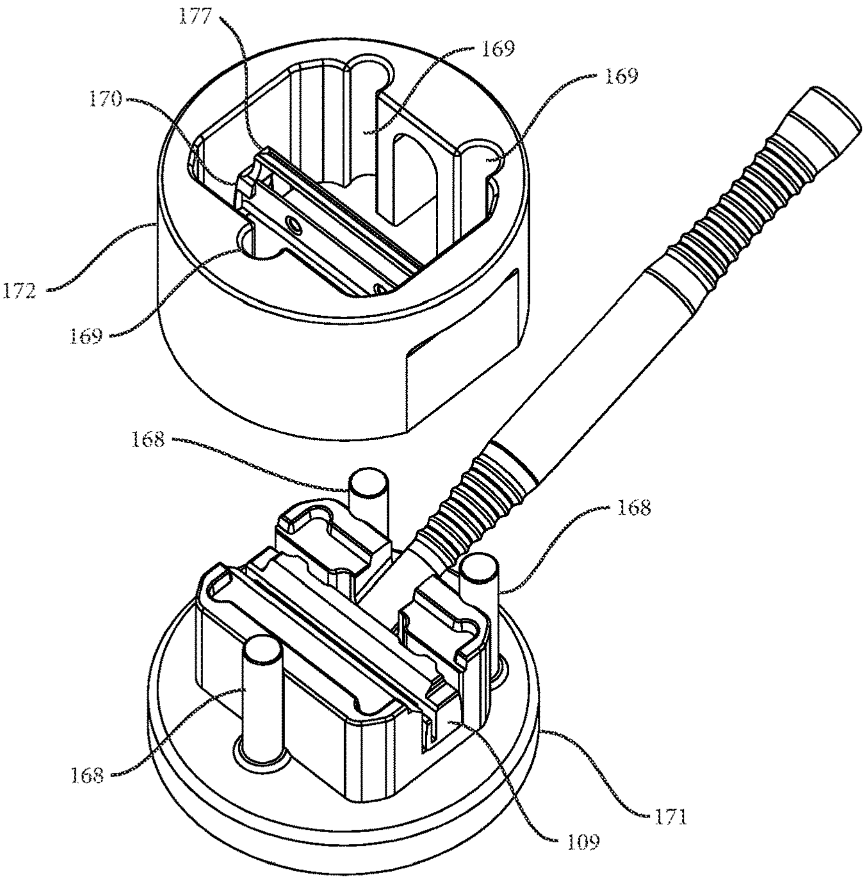
FIGS. 37A-37B show an alternative embodiment of the separate double edge safety razor blade and shaving head back alignment component interfacing with a shaving head front component alignment component with a shaving head front component loaded. When used together the assembly decreases the amount of variation in the blade breaking and loading action between the shaving head front component and the shaving head back component.

Referring to FIG. 37A there is shown the shaving head front component alignment ring 172 with a retained shaving head front component 177 in a pre-loaded temporary position with the guide rail details 169 aligned above the guide pins 168 integrated into the shaving head back retention press block 171. The shaving head front alignment component 172 is configured to be manually pushed in a downward direction (e.g., parallel with gravity while resting on a horizontal surface relative to earth) toward the press block 171 by aligning the guide pins 168 with the corresponding guide rail details 169. This ensures a continuous, straight downward motion without wiggling or misalignment to consistently break new blades 140 onto the shaving head front component 177 in the same place even after repeated uses.

Figure 37B:
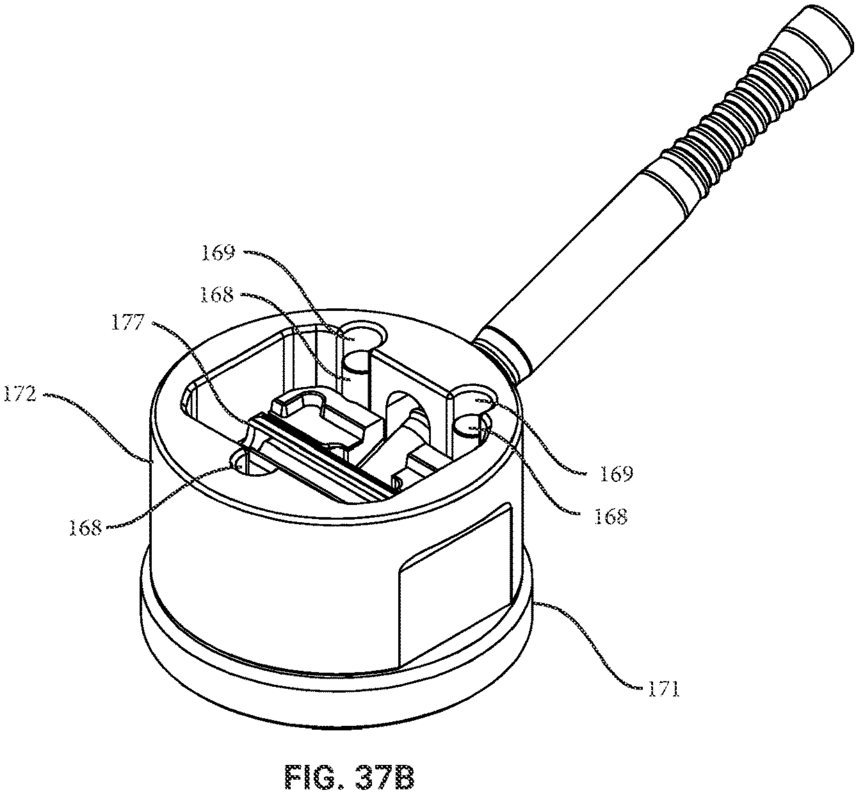

Referring to FIG. 37B there is shown the shaving head front component alignment component 172 with a retained shaving head front component 177 in a loaded position with the guide rail details 169 engaged with the guide pins 168.

Referring to FIGS. 38A-38B and 39A-39C there is shown an alternative embodiment of a shaving head front component 177, which can be used in conjunction with any shaving head back component 109 and press block 159 disclosed herein. The shaving head front component 177 retains all of the features from the shaving head front component 108 with the addition of a punch (see FIGS. 2A-2D) and retention guide 178, which is a multi-thickness retention guide along a length thereof. A thinner blade breaking thickness portion 173 toward the blade 140 is optimized to cleanly break a standard double edge safety razor blade 140. A thicker blade retention thickness portion 174 toward a front end (where the exposed blades protrude when installed) of the shaving head front component is optimized to retain a standard double edge safety razor blade 140 by controlling the gaps between the retention guide and punch 178, blade slot 120, safety razor long half 123, and safety razor short half 124 to an optimal dimension to retain the safety razor blade front component 177 when the razor is loaded and ready to shave. Example dimensions are as follows: the thicker portion 174 can be 0.0265+/−0.0005 inches and the thinner portion 173 can be 0.0225+/−0.0005 inches. These dimensions are relative to the shaving head back slot 120, which in this example is 0.035+/−0.0005 inches. The gap between the thick section and the back slot is important for retaining the blade. A blade motion limiting feature is integrated into the blade breaking edge 175. This feature can optionally be accomplished with a different finish or by adding a different coating or material that has the function of creating additional friction between the blade breaking edge 175 and a standard double edge safety razor blade 140. Additional friction created between these two elements reduces or eliminates the tendency for a standard double edge safety razor blade 140 to move in any direction that is parallel to the breaking edge 175 surface. Movement in any direction that is parallel to the breaking edge 175 surface during the blade loading process can cause the final loaded positions of the safety razor long half 123, and safety razor short half 124 to be inaccurate and not load properly.

Figure 41A:
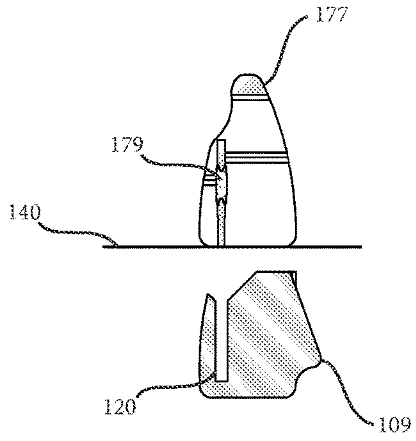
Figure 41B:
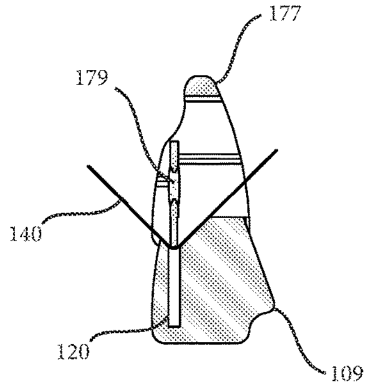
Figure 41C:
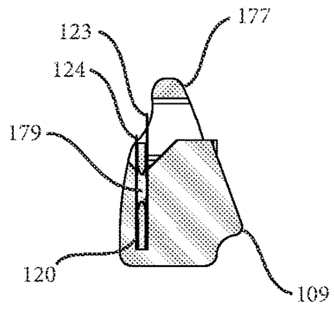

Referring to FIG. 41A-41C there is shown the shaving head front component 177 with additional blade retention features added on, which can be used in combination with any press block 159 disclosed above. A blade retention feature 179 is shown that is overmolded in two locations on the shaving head front component 177 using the cross-sectional shape of two through holes 180 (See FIG. 38A) countersunk on both sides for retention. The retention feature 179 is made from a differing material than a standard double edge safety razor blade as well as the shaving head front component 177 having the effect of introducing additional friction against a standard double edge safety razor blade. In addition, the blade retention feature may be made in flexible material allowing it to compress when the razor is loaded (see FIG. 39C). A compressed blade retention feature 179 creates more tension between the retention guide and punch 178, blade slot 120, safety razor long half 123, and safety razor short half 124 holding all parts together while the razor is used for shaving. In an alternative configuration, the shape of the retention features can be any shape when viewed from the axial direction of the through holes 180 but must maintain an optimal height proud of the surrounding surface.

What is claimed is:

1. An assembly, comprising:

a shaving head, including: a front component having a retention guide, a first position stop and a second position stop at a distance offset from the first position stop; and a back component having a blade slot configured to receive a first blade portion and a second blade portion formed from breaking a double-edge safety razor blade such that the first blade portion has a different width compared to the second blade portion, the retention guide being configured to retain the first blade portion and the second blade portion in the blade slot responsive to the retention guide being at least partially inserted into the blade slot; and a blade breaking component, including:

a first sloped guide surface having a first end and a second end and a second sloped guide surface having a first end and a second end, the first end of the first sloped guide surface and the first end of the second sloped guide surface forming an opening, the second end of the first sloped guide surface and the second end of the second sloped guide surface converging to form a channel below the second end of the first guide sloped surface and the second end of the second guide sloped surface, an angle formed by the first sloped guide surface and the second sloped guide surface being between 45 and 179 degrees, and the channel having opposing parallel surfaces orthogonal to a plane defined by the opening, the channel being positioned off-center relative to a midpoint between the first end of the first sloped guide surface and the first end of the second sloped guide surface.

2. The assembly of claim 1, wherein the angle is between 84 and 96 degrees, the blade breaking component further comprising a plurality of registration members arranged relative to the first sloped guide surface and the second sloped guide surface to receive the double-edge safety razor blade across the opening defined by the first and second sloped guide surfaces.

3. The assembly of claim 1, further comprising a plurality of guide pins arranged outside of the channel and extending above the first sloped guide surface and the second sloped guide surface.

4. The assembly of claim 1, in combination with a press block including a plurality of guide pins arranged outside of the channel, and in combination with a shaving head front alignment component, the alignment component comprising a plurality of recesses arranged to receive therein corresponding ones of the plurality of guide pins responsive to the alignment component being received in the press block.

5. The assembly of claim 4, wherein the plurality of guide pins are composed of a different material than that of the press block to facilitate registration thereof relative to the alignment component.

6. The assembly of claim 1, wherein the retention guide has a multi-thickness along a length thereof such that a thickness of the retention guide is thinner toward the razor blade to cleanly break the double-edge safety razor blade.

7. The assembly of claim 1, in combination with the double-edge safety razor blade having a first sharp edge and a second sharp edge, the first sharp edge extending beyond the second sharp edge along a plane parallel to major surfaces of the first blade portion and the second blade portion such that the first sharp edge and the second sharp edge form a shaving angle between 5 and 30 degrees.

8. The assembly of claim 1, in combination with a press block having a conforming recess configured to receive therein the back component, the press block including a registration feature configured to hold the double-edge safety razor blade in unbroken form relative to the press block.

* * * * *